United States Patent
Kitamura et al.

(10) Patent No.: US 6,913,798 B2
(45) Date of Patent: Jul. 5, 2005

(54) SEALING MATERIAL FOR PLASTIC LIQUID CRYSTAL DISPLAY CELLS INCLUDING TWO-COMPONENT EPOXY RESIN COMPOSITION

(75) Inventors: Tadashi Kitamura, Sodegaura (JP); Hiroshi Kondo, Sodegaura (JP); Sunao Maeda, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 248 days.

(21) Appl. No.: 10/069,048

(22) PCT Filed: Jun. 21, 2001

(86) PCT No.: PCT/JP01/05330

§ 371 (c)(1),
(2), (4) Date: Feb. 21, 2002

(87) PCT Pub. No.: WO01/98411

PCT Pub. Date: Dec. 27, 2001

(65) Prior Publication Data

US 2002/0176046 A1 Nov. 28, 2002

(30) Foreign Application Priority Data

Jun. 21, 2000 (JP) ........................................ 2000-185871

(51) Int. Cl.[7] .......................... B32B 31/12; C08G 59/40; C08L 63/00; G02F 1/3339
(52) U.S. Cl. ...................... 428/1.53; 156/330; 349/122; 349/153; 525/523; 528/90; 528/109
(58) Field of Search ......................... 156/330; 428/1.53; 349/122, 153; 525/505, 507, 523; 528/90, 99, 109

(56) References Cited

U.S. PATENT DOCUMENTS

| | | | |
|---|---|---|---|
| 4,879,414 A | * | 11/1989 | Johnson et al. ............. 564/388 |
| 4,882,216 A | * | 11/1989 | Takimoto et al. ........... 525/505 |
| 4,990,679 A | | 2/1991 | Wolf et al. |
| 5,143,999 A | | 9/1992 | Setiabudi et al. |
| 5,214,098 A | | 5/1993 | Setiabudi et al. |
| 5,665,797 A | * | 9/1997 | Tahara et al. ............... 525/523 |
| 5,994,475 A | | 11/1999 | Roth et al. |
| 6,153,719 A | * | 11/2000 | Abbey et al. ................. 528/90 |
| 6,219,126 B1 | * | 4/2001 | Von Gutfeld ............... 349/153 |
| 6,555,187 B1 | * | 4/2003 | Kitamura ................... 428/1.53 |
| 2002/0008821 A1 | * | 1/2002 | Lee et al. ................... 349/139 |

FOREIGN PATENT DOCUMENTS

| | | | |
|---|---|---|---|
| EP | 0 370 445 A | | 11/1989 |
| EP | 0 523 001 A1 | | 1/1993 |
| EP | 787696 | * | 8/1997 |
| EP | 1 061 402 A | | 6/2000 |
| JP | 61-127721 | * | 6/1986 |
| JP | 62-133425 | * | 6/1987 |
| JP | 11-246743 | * | 9/1999 |
| JP | 2000-72955 | * | 3/2000 |
| JP | 2000-347203 | * | 12/2000 |
| JP | 2001-100223 | | 4/2001 |
| JP | 2001-100224 | | 4/2001 |

OTHER PUBLICATIONS

Machine translation for Japan 11-246743.*

* cited by examiner

Primary Examiner—Steven D. Maki
(74) Attorney, Agent, or Firm—Burns, Doane, Swecker & Mathis, LLP

(57) ABSTRACT

A sealant composition for a plastic liquid crystal display cell is composed of a two-component epoxy resin composition of a base resin liquid and a curing agent liquid, wherein the base resin is a liquid epoxy resin having from 1.7 to 6 in weight average of epoxy groups in one molecule and an ionic conductivity of 2 mS/m or less; and the curing agent has an ionic conductivity of 0.6 mS/m or less. The sealant composition facilitates the fabrication of plastic liquid crystal displays having enhanced durability and sealant properties, particularly in high temperature and high humidity environments.

11 Claims, 1 Drawing Sheet

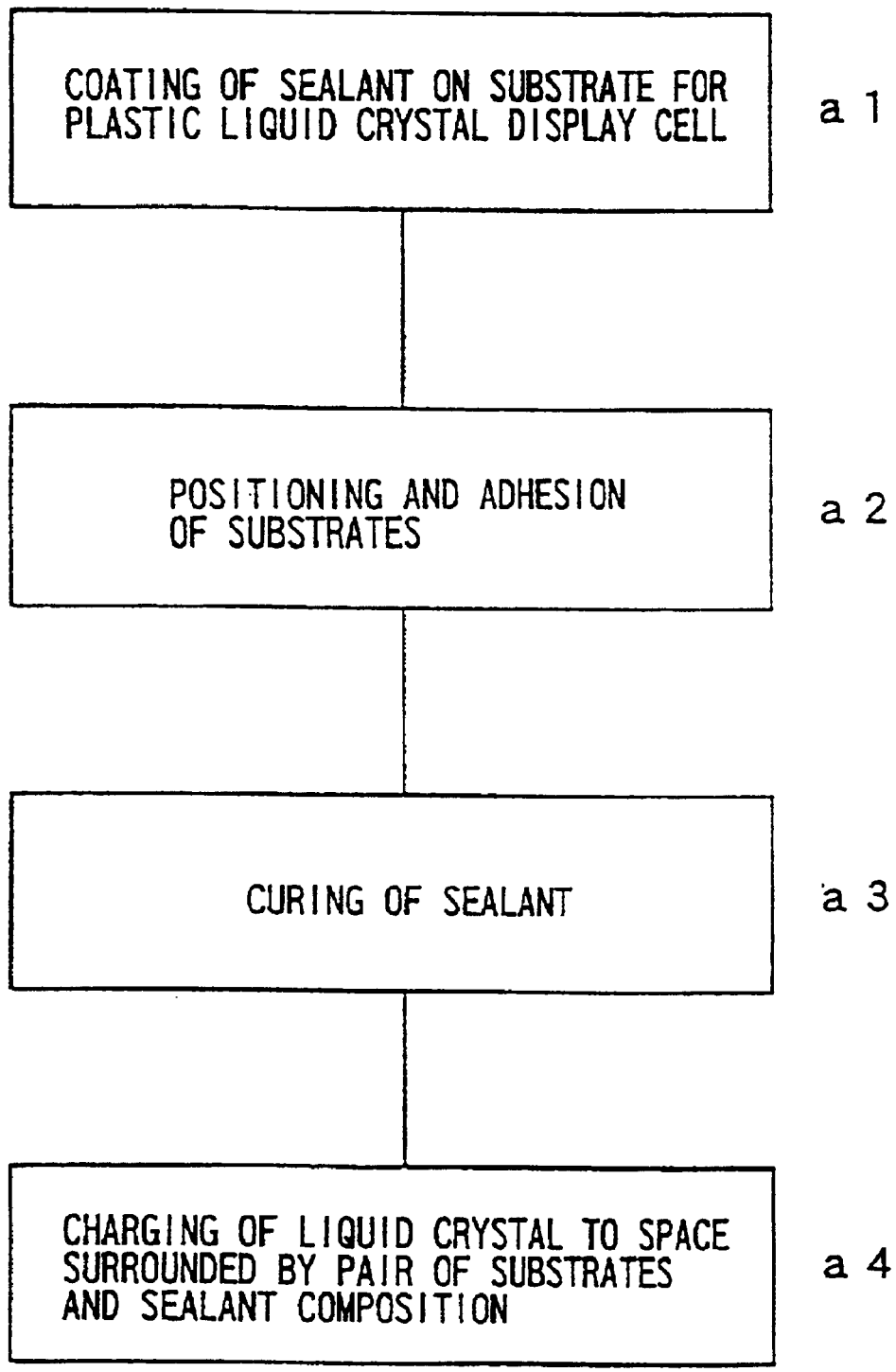

SEALING MATERIAL FOR PLASTIC LIQUID CRYSTAL DISPLAY CELLS INCLUDING TWO-COMPONENT EPOXY RESIN COMPOSITION

TECHNICAL FIELD TO WHICH THE INVENTION BELONGS

The present invention relates to a sealant composition for a plastic liquid crystal display cell, a process for producing a plastic liquid crystal display cell, and a plastic liquid crystal display cell.

PRIOR ART

In recent years, a light weight and thin liquid crystal display panel, i.e., a plastic liquid crystal display cell, is widely used as a display panel for a portable telephone. The plastic liquid crystal display cell is formed by filling a liquid crystal in a space surrounded by a pair of plastic substrates having transparent electrodes and an orientation film arranged thereon and a sealant composition for a plastic liquid crystal display cell, which is a thermosetting resin composition.

The service environment of the liquid crystal display cell is becoming severer, and therefore a high quality plastic liquid crystal display cell is demanded that has impact resistance withstanding the environment and has high handling safety.

As described in the foregoing, the demand of products using the plastic liquid crystal cell is being considerably increased, and in order to produce plastic liquid crystal cells of higher uniformity and higher quality in the production sites of those fields of art, the heat adhesion step of adhering the pair of substrates by curing the thermosetting resin composition between the pair of substrates is reviewed. A multiplaten heat press adhesion method, in which plural substrates are heat adhered at a time, is mainly employed from the standpoint of productivity, and a sheet heat press adhesion method, in which substrates are heat adhered one-by-one, is also employed from the standpoint of assuring further reliability of the plastic liquid crystal display cell.

As the sealant composition for a plastic liquid crystal display cell, a two-component thermosetting sealant composition for a plastic liquid crystal cell has been known, and for example, two-component sealant compositions have been known that are formed with a curing agent liquid containing a trifunctional mercapto compound and a base resin liquid containing polyethylene glycol diglycidyl ether or the like. Although these sealant compositions have sufficient basic performance with respect to the sealing characteristics for a plastic liquid crystal display cell, i.e., the adhesion sealing property, the electric insulating property, the non-contamination property for liquid crystals and the like under the ordinary state, the water vapor gas barrier property, the water resistant strength characteristics and the like under a high temperature and high humidity environment at from 60 to 80° C. are considerably low. Therefore, when they are used under a high temperature and high humidity environment for a long period of time, moisture is penetrated into the interior of the plastic liquid crystal display cell through the sealant composition with the lapse of time, and as a result, functional disorder of the liquid crystal display cell, such as display unevenness, decrease in response speed and the like, occurs.

An object of the invention is to provide a one-component or two-component sealant composition for a plastic liquid crystal display cell that is capable of being applied to not only a multiplaten heat press adhesion method but also a sheet heat press adhesion method and of producing a plastic liquid crystal display cell having high reliability under a high temperature and high humidity environment, a process for producing a liquid crystal display cell using the composition, and a liquid crystal cell.

More particularly, it is to provide a sealant composition for a plastic liquid crystal display cell that enables secure adhesion without seal leak and effusion of the liquid crystal by an adhesion process using a vacuum sheet heat press adhesion or rigid sheet heat press adhesion method, has a small free ion concentration derived from the composition, and is excellent in water vapor gas barrier property, water resistant adhesion reliability, heat resistant adhesion reliability, impact resistant adhesion property and dimensional stability, a process for producing a liquid crystal display cell using the composition, and a liquid crystal cell.

DISCLOSURE OF INVENTION

The invention is a sealant composition for a plastic liquid crystal display cell, comprising an epoxy resin composition, wherein (I) an aqueous solution obtained by mixing the composition and 10 times by weight of pure water at from 40 to 80° C. has an ionic conductivity of 1 mS/m or less, and a cured product of the composition has (II) a water vapor permeability at 60° C. passing a cured film of the composition having a thickness of 100 $\mu$m of less than 200 g/m$^2$·24 hrs, (III) a heat deformation temperature (Tg) of a cured product of the composition in a range of from 0 to 85° C., and (IV) a storage modulus under room temperature of a cured product of the composition in a range of from $0.5 \times 10^4$ to $1 \times 10^6$ Pa.

In the invention it is preferable that the epoxy resin composition has (V) an E type viscosity at from 50 to 100° C. after coating to a thickness of 50 $\mu$m and being subjected to a heat treatment at from 50 to 85° C. for 20 minutes of from 5 to 5,000 Pa·s.

According to the invention, owing to the characteristics (I) to (V), the amount of electroconductive ions formed from the composition is small, the cured product of the composition is low in water vapor permeability, and seal leak is difficult to be formed upon heat pressing.

The invention also is a sealant composition for a plastic liquid crystal display cell, comprising a two-component epoxy resin composition consisting of a base resin liquid containing the following (1) and (3) to (6) and a curing agent liquid containing the following (2A) or a mixture of the following (2A) and (3), wherein the two-component epoxy resin composition is obtained from a two-component mixture of the base resin liquid and the curing agent liquid contains the following (1) to (6):

(1) from 15 to 84% by weight of a liquid epoxy resin having from 1.7 to 6 in weight average of epoxy groups in one molecule and an ionic conductivity of an aqueous solution obtained by extraction separation by contact mixing with 10 times by weight of pure water at from 40 to 80° C. of 2 mS/m or less, (2A) from 10 to 50% by weight of a curing agent containing one or a mixture of two or more selected from (2A-1) a tetrafunctional mercapto compound or (2A-2) a modified polymercapto derivative, having an ionic conductivity of an aqueous solution obtained by extraction separation by contact mixing with 10 times by weight of pure water at from 40 to 80° C. of 0.6 mS/m or less, (3) from 0.01 to 15% by weight of a curing accelerator, (4) from 5 to 50% by weight of an inorganic filler, (5) from 0.1 to 5% by weight of a silane coupling agent, and (6) from 1 to 25% by weight of rubbery polymer fine particles having a softening temperature of 0° C. or less and an average particle diameter of primary particles of from 0.01 to 5 $\mu$m.

In the invention it is preferable that the tetrafunctional mercapto compound (2A-1) is pentaerythritol tetrakis(3-mercaptopropionate), and the modified polymercapto derivative (2A-2) is a modified polymercapto derivative obtained by reacting 1 equivalent in terms of active hydrogen of pentaerythritol tetrakis(3-mercaptopropionate) with from 0.01 to 0.3 equivalent in terms of active isocyanate group of a diisocyanate compound and/or an isocyanate prepolymer thereof.

According to the invention, owing to the components (1) to (6) contained in those proportions, a sealant composition for a plastic liquid crystal display cell having the characteristics (I) to (V) is obtained.

The invention also is a sealant composition for a plastic liquid crystal display cell comprising a one-component epoxy resin composition containing the following (1) to (6):

(1) from 15 to 84% by weight of an epoxy resin having from 1.7 to 6 in weight average of epoxy groups in one molecule and an ionic conductivity of an aqueous solution obtained by extraction separation by contact mixing with 10 times by weight of pure water at from 40 to 80° C. of 2 mS/m or less, (2B) from 10 to 50% by weight of a curing agent containing one or a mixture of two or more selected from (2B-1) a micro-encapsulated imidazole compound and (2B-2) a methyl methacrylate adduct of an alicyclic diamine, having an ionic conductivity of an aqueous solution obtained by extraction separation by contact mixing with 10 times by weight of pure water at from 40 to 80° C. of 0.6 mS/m or less, (3) from 0.01 to 15% by weight of a curing accelerator, (4) from 5 to 50% by weight of an inorganic filler, (5) from 0.1 to 5% by weight of a silane coupling agent, and (6) from 1 to 25% by weight of rubbery polymer fine particles having a softening temperature of 0° C. or less and an average particle diameter of primary particles of from 0.01 to 5 $\mu$m.

According to the invention, owing to the components (1) to (6) contained in those proportions, a sealant composition for a plastic liquid crystal display cell having the characteristics (I) to (V) is obtained.

The sealant composition for a plastic liquid crystal cell of the invention is characterized in that (I) an aqueous solution obtained by mixing the composition and 10 times by weight the composition of pure water at from 40 to 80° C. has an ionic conductivity of 1 mS/m or less, and a cured product of the composition has (II) a water vapor permeability at 60° C. passing a cured film of the composition having a thickness of 100 $\mu$m of less than 200 g/m$^2$·24 hrs, (III) a heat deformation temperature (Tg) of a cured product of the composition in a range of from 0 to 85° C., and (IV) a storage modulus under room temperature of a cured product of the composition in a range of from $0.5 \times 10^4$ to $1 \times 10^6$ Pa.

According to the invention, owing to the characteristics (I) to (IV), the amount of electroconductive ions formed from the composition is small, and the cured product of the composition is low in water vapor permeability.

The sealant composition for a plastic liquid crystal display cell of the invention is characterized by having:

(V) an E type viscosity at from 50 to 100° C. after coating to a thickness of 50 $\mu$m and being subjected to a heat treatment at from 50 to 85° C. for 20 minutes of from 5 to 5,000 Pa·s.

According to the invention, owing to the characteristics (V), seal leak is difficult to be formed upon heat pressing.

The invention is characterized in that the epoxy resin (1) is a mixed composition of (1-1) an aliphatic and/or alicyclic epoxy resin and (1-2) an aromatic epoxy resin, the aliphatic and/or alicyclic epoxy resin (1-1) is one or a mixture of two or more selected from higher alcohol monoglycidyl ether, polyoxyalkylene glycol diglycidyl ether, 1,6-hexanediol diglycidyl ether, neopentyl glycol diglycidyl ether and glycerin triglycidyl ether, and the aromatic epoxy resin (1-2) is one or a mixture of two or more selected from the group consisting of a bisphenol A type epoxy resin or an alkylene oxide adduct type epoxy resin thereof, a bisphenol F type epoxy resin or an alkylene oxide adduct type epoxy resin thereof, a bisphenol S type epoxy resin, and a bisphenol AD type epoxy resin.

According to the invention, owing to the epoxy resins used as the epoxy resin (1), a sealant composition for a plastic liquid crystal display cell having higher sealing reliability can be obtained.

The invention is characterized in that the curing accelerator (3) is at least one selected from an alkyl urea derivative, trisdimethylamino methylphenol salt and 1,8-diazabicyclo(5,4,0)undecene hepta-salt.

According to the invention, owing to those substances used as the curing accelerator (3), a sealant composition for a plastic liquid crystal display cell having higher sealing reliability can be obtained.

The invention is characterized in that the alkyl urea derivative is at least one selected from
3-(p-chlorophenyl)-1, 1-dimethyl urea,
3-(o,p-dichlorophenyl)-1,1-dimethyl urea,
2,4-(bis(1,1-dimethyl urea))toluene and
2,6-(bis(1,1-dimethyl urea))toluene.

According to the invention, owing to those substances used as the alkyl urea derivative, a sealant composition for a plastic liquid crystal display cell having higher sealing reliability can be obtained.

The invention is characterized in that the rubbery fine particles (6) have a primary particle diameter of from 0.1 to 1 $\mu$m and are crosslinked rubbery polymer particles.

According to the invention, owing to the rubbery polymer fine particles (6) having a primary particle diameter of from 0.1 to 1 $\mu$m and being crosslinked rubbery particles, reliability in adhesion durability and heat resistant rigidity can be obtained.

The invention is characterized in that at least a part of the inorganic filler (4) is a graft product with the epoxy resin (1) and/or the silane coupling agent (5), and the graft product has a graft ratio expressed by a weight increasing rate obtained by a repeating solvent washing method of from 1 to 50 parts by weight in total of the epoxy resin (1) and the silane coupling agent (5) per 100 parts by weight of the inorganic filler (4).

According to the invention, owing to the substance used as the inorganic filler (4), flowability of the sealant composition for a plastic liquid crystal display cell can be assured to improve workability upon screen printing or dispenser coating.

The invention also is a process for producing a plastic liquid crystal display cell comprising:

a coating step of coating the sealant composition for a plastic liquid crystal display cell on one substrate of a pair of substrates for a plastic liquid crystal display cell, an adhering step of positioning the one substrate and the other substrate and adhering the pair of substrates for a plastic liquid crystal display cell, a sealant composition curing step of subjecting the pair of substrate adhered to each other in the adhering step to a heat pressing treatment at from 60 to 100° C. to cure the sealant composition for a plastic liquid crystal display cell, and a liquid crystal charging step of charging a liquid crystal to a space surrounded by the pair of substrates for a plastic liquid crystal display cell and the sealant composition for a plastic liquid crystal display cell therebetween.

According to the invention, owing to the use of the sealant composition for a plastic liquid crystal display cell, a plastic liquid crystal display cell assuring high sealing reliability under a high temperature and high humidity environment can be produced.

The invention also is a plastic liquid crystal display cell obtained by the process for producing a plastic liquid crystal display cell.

According to the invention, because it is obtained by the process for producing a plastic liquid crystal display cell, stable display can be realized for a long period of time under a high temperature and high humidity environment.

BRIEF DESCRIPTION OF DRAWING

Other and further objects, features, and advantages of the invention will be more explicit from the following detailed description taken with reference to the drawings wherein:

FIG. 1 is a flowchart of a process for producing a plastic liquid crystal display cell according to the invention.

BEST MODE FOR CARRYING OUT THE INVENTION

The sealant composition for a plastic liquid crystal display cell of the invention is an epoxy resin composition and simultaneously assures the following functionalities (I) to (IV).

(I) An aqueous solution obtained by mixing the composition and 10 times by weight the composition of pure water at from 40 to 80° C. has an ionic conductivity of 1 mS/m or less.

(II) A water vapor permeability at 60° C. passing a cured film of the composition having a thickness of 100 $\mu$m is less than 200 g/m$^2$·24 hrs.

(III) A heat deformation temperature (Tg) of a cured product of the composition is in a range of from 0 to 85° C.

(IV) A storage modulus under room temperature of a cured product of the composition in a range is from $0.5 \times 10^4$ to $1 \times 10^6$ Pa.

In the sealant composition for a plastic liquid crystal display cell of the invention, a tetrafunctional mercapto compound or a prepolymer thereof is used as a curing agent for a particular epoxy resin, and simultaneously a curing accelerator, such as an alkyl urea derivative, rubbery polymer fine particles, an inorganic filler and a silane coupling agent, as well as, depending on necessity, high softening point polymer fine particles, wax and the like are appropriately contained, whereby the foregoing (I) to (IV), properties relating to a thermosetting sealant composition for a liquid crystal display cell and a cured product thereof that have not yet been achieved, are simultaneously satisfied, so as to realize high performance of a sealant composition for a plastic liquid crystal display cell.

The characteristics shown by (I) to (IV) maybe achieved by changing the amount ratios of the epoxy resin, the curing agent and the curing accelerator, such as an alkyl urea derivative, as well as, depending on necessity, the inorganic filler and the rubbery polymer fine particles. The characteristics will be described in detail below.

In the sealant composition for a plastic liquid crystal display cell of the invention, it is preferred that an aqueous solution obtained by mixing the composition and 10 times by weight the composition of pure water at from 40 to 80° C. has an ionic conductivity of 1 mS/m or less. According to the configuration, maintenance of the long-term display functionality of the resulting liquid crystal display cell can be assured. It is more preferable that the ionic conductivity is 0.2 mS/m or less.

It is preferred that a water vapor permeability at 60° C. passing a cured film of the sealant composition for a plastic liquid crystal display cell having a thickness of 100 $\mu$m at 60° C. and relative humidity of 95% per 24 hours is less than 200 g/m$^2$·24 hrs. According to the configuration, display unevenness and decrease of the response speed in earlier stages of the resulting liquid crystal cell can be suppressed. More preferably, the water vapor permeability at 60° C. is less than 150 g/m$^2$·24 hrs, and further preferably less than 100 g/m$^2$·24 hrs.

The water vapor permeability per 100 $\mu$m in thickness (X) herein is obtained by the following equation.

Water vapor permeability (X)=Measured water vapor permeability×(Film thickness of sample ($\mu$m)/100)

It is preferred that the heat deformation temperature (Tg) of a cured product of the sealant composition for a plastic liquid crystal display cell measured by TMA (thermomechanical analysis) is 0° C. or more. According to the configuration, the display reliability critical temperature for a long period of time of the liquid crystal display cell can be improved. It is preferably 85° C. or less, and according to the configuration, the impact resistance and the heat resistant adhesion reliability of the liquid crystal display cell can be assured. It is more preferably in a range of from 20 to 80° C.

It is preferred that the storage modulus of a cured product itself of the sealant composition for a plastic liquid crystal display cell under room temperature is in a range of from $0.5 \times 10^4$ to $1 \times 10^6$ Pa. According to the configuration, the production yield of the resulting liquid crystal display cell is improved. It is more preferably in a range of from $0.8 \times 10^4$ to $0.9 \times 10^6$ Pa, and further preferably in a range of from $1 \times 10^4$ to $0.8 \times 10^6$ Pa.

It is more preferred that the sealant composition for a plastic liquid crystal display cell of the invention is a composition that assures the foregoing (I) to (IV) and also the following (V). The property shown by (V) is that an E type viscosity measured with an E type viscometer at from 50 to 100° C. after coating to a thickness of 50 µm and being subjected to a heat treatment at from 50 to 85° C. for 20 minutes (hereinafter referred to as subjecting to B stage) is in a range of from 5 to 5,000 Pa·s. When it exceeds 5 Pa·s, formation of seal leak upon heat press adhesion by multi-platen heat press or sheet heat press can be effectively avoided and suppressed. When it is 5,000 Pa·s or less, it is preferred since desired gap control can be ensured upon heat press adhesion by multiplaten heat press or sheet heat press. It is preferably in a range of from 5 to 3,000 Pa·s, and more preferably in a range of from 5 to 1,000 Pa·s.

The characteristics, such as Tg, the modulus, the water vapor permeability and the like, as the characteristics of the sealant composition for a plastic liquid crystal display cell can be owned by changing the amount ratios of the epoxy resin, the curing agent and the curing accelerator, such as an alkyl urea derivative, as well as, depending on necessity, the inorganic filler and the rubbery polymer fine particles.

The Tg strongly depends on the species and the amount ratio of the epoxy resin, the species and the amount ratio of the curing agent, the curing conditions and the like. The modulus strongly depends on the species and the amount ratio of the epoxy resin, the species and the amount ratio of the curing agent, the amount ratio of the rubber, the curing conditions and the like. The water vapor permeability strongly depends on the amount ratio of the inorganic filler, the curing conditions and the like. Therefore, the foregoing characteristics may be owned by selecting or determining the amount ratios and the curing conditions in such a manner that they are in the preferred ranges.

In order to satisfy the characteristics of the sealant composition for a plastic liquid crystal display cell of the invention, it is preferred that the epoxy resin composition is formed by mixing a tetrafunctional mercapto compound in such a manner that the amount of an active mercapto group and an active hydroxyl group and/or an ester-modified group thereof of the tetrafunctional mercapto compound is in a range of from 0.5 to 1.2 equivalents, preferably in a range of from 0.7 to 1.1 equivalents, and more preferably in a range of from 0.75 to 1 equivalent, per 1 equivalent of an epoxy group of the epoxy resin, and by mixing an alkyl urea derivative, as the curing accelerator, in a range of from 0.1 to 20% by weight, and more preferably in a range of from 0.1 to 10% by weight.

As a preferred embodiment of the sealant composition for a plastic liquid crystal display cell of the invention, in a two-component sealant composition for a plastic liquid crystal display cell, the epoxy resin composition contains (1) from 15 to 84% by weight of a liquid epoxy resin having from 1.7 to 6 in weight average of epoxy groups in one molecule and an ionic conductivity of an aqueous solution obtained by extraction separation by contact mixing with 10 times by weight of pure water at from 40 to 80° C. of 2 mS/m or less, (2A) from 10 to 50% by weight of a curing agent containing one or a mixture of two or more selected from (2A-1) a tetrafunctional mercapto compound or (2A-2) a modified polymercapto derivative, having an ionic conductivity of an aqueous solution obtained by extraction separation by contact mixing with 10 times by weight of pure water at from 40 to 80° C. of 0.6 mS/m or less, (3) from 0.01 to 15% by weight of a curing accelerator,
(4) from 5 to 50% by weight of an inorganic filler,
(5) from 0.1 to 5% by weight of a silane coupling agent, and
(6) from 1 to 25% by weight of rubbery polymer fine particles having a softening point temperature of 0° C. or less and an average particle diameter of primary particles of from 0.01 to 5 µm. The term primary particle herein means a particle that cannot be further separated in a mechanical manner.

In a one-component sealant composition for a plastic liquid crystal cell, the epoxy resin composition contains (1) from 15 to 84% by weight of an epoxy resin having from 1.7 to 6 in weight average of epoxy groups in one molecule and an ionic conductivity of an aqueous solution obtained by extraction separation by contact mixing with 10 times by weight of pure water at from 40 to 80° C. of 2 mS/m or less, (2B) from 10 to 50% by weight of a curing agent containing one or a mixture of two or more selected from (2B-1) a micro-encapsulated imidazole compound and (2B-2) a methyl methacrylate adduct of an alicyclic diamine, having an ionic conductivity of an aqueous solution obtained by extraction separation by contact mixing with 10 times by weight of pure water at from 40 to 80° C. of 0.6 mS/m or less, (3) from 0.01 to 15% by weight of a curing accelerator,
(4) from 5 to 50% by weight of an inorganic filler,
(5) from 0.1 to 5% by weight of a silane coupling agent, and
(6) from 1 to 25% by weight of rubbery polymer fine particles having a softening point temperature of 0° C. or less and an average particle diameter of primary particles of from 0.01 to 5 µm.

In the sealant composition for a plastic liquid crystal cell of the invention, depending on necessity, (7) high softening point acrylic polymer fine particles having a softening point temperature of 50° C. or more and an average particle diameter of primary particles thereof of 2 µm or less (hereinafter referred to as high softening point polymer fine particles), (8) wax, (9) a controlling agent for providing gaps, (10) electroconductive beads, (11) a solvent, a leveling agent, a pigment, a dye, a plasticizer, a defoaming agent, other additives and the like may be appropriately contained.

The constitutional components of the sealant composition for a plastic liquid crystal cell of the invention will be described.

(1) Epoxy Resin

Examples of the epoxy resin (1) as a component of the composition of the invention include a monofunctional epoxy resin, a polyfunctional epoxy resin and the like. Specifically, examples thereof include a cresol novolak type epoxy resin, a bisphenol A type epoxy resin, a bisphenol F type epoxy resin, a triphenolmethane type epoxy resin, a triphenolethane type epoxy resin and the like, and they may be used solely or by mixing two or more of them.

It is preferred to use, as the epoxy resin (1), an epoxy resin having 1.7 or more, preferably 1.9 or more, and more preferably 2.0 or more, but 6 or less, in terms of weight average, of epoxy groups per one molecule of the epoxy resin. When the epoxy resin (1) having from 1.7 to 6, in terms of weight average, of epoxy groups per one molecule of the epoxy resin, good water resistance and good heat resistance of the composition of the invention can be obtained.

The epoxy resin (1) has an ionic conductivity of an aqueous solution obtained by mixing the composition and 10 times by weight of pure water at from 40 to 80° C. of 10 mS/m or less, preferably 5 mS/m or less, more preferably 2 mS/m or less, and further preferably the measurement limit or less. When the ionic conductivity is 10 mS/m or less, upon contacting a cured product of the composition of the invention with a liquid crystal, migration of free ions from the cured product to the liquid crystal phase can be inhibited. In the case where a mixture of different epoxy resins is used, the foregoing requirement may be satisfied as an index of the total content of free ions in the mixture.

The content of the epoxy resin (1) is from 15 to 84% by weight.

The epoxy resin (1) has a hydrolytic chlorine concentration in the epoxy resin obtained by conversion from a chloride ion in an aqueous solution obtained by extracting with boiling water for 24 hours of 300 ppm or less, preferably 100 ppm or less, more preferably 50 ppm or less, and further preferably the measurement limit or less. When the hydrolytic chlorine concentration is 300 ppm or less, upon contacting a cured product of the composition of the invention with a liquid crystal, migration of free ions from the cured product to the liquid crystal phase can be inhibited.

The epoxy resin (1) is preferably a mixture of an epoxy resin that is in a liquid state at room temperature (25° C.) and an epoxy resin in a solid state at room temperature. The mixture is preferably in a liquid state at from −10 to 50° C.

The polystyrene conversion weight average molecular weight of the epoxy resin (1) obtained by gel permeation chromatography (GPC) is preferably 7,000 or less, more preferably from 150 to 5,000, and further preferably from 350 to 3,500. When the polystyrene conversion weight average molecular weight is 7,000 or less, the E type viscosity after subjecting to B stage of the composition of the invention can be 1,000 Pa·s or less, which is suitable for a heat adhesion method by sheet heat press. When the polystyrene conversion weight average molecular weight is 150 or more, the Tg suitability, i.e., the optimum heat deformation temperature (Tg), and the B stage suitability, i.e., the optimum E type viscosity after subjecting to B stage, of a cured product of the composition of the invention can be obtained.

As the epoxy resin (1), those having been purified or having high purity to satisfy the foregoing requirements by the known purification methods that mainly aim decrease of hydrolytic chlorine and removal of free ions. Examples of the purification methods include a purification method by water washing and solvent extraction, an ultra filtration method, a distillation purification method and the like.

As the method for determining the epoxy resin (1) present in the composition of the invention and the amount thereof, such a method is generally used that an extract obtained by solvent extraction is fractionated and quantitatively determined by GPC, and identification is carried out by NMR (nuclear magnetic resonance spectrum) or the like for the respective fractions. Examples of the method for determining the epoxy resin (1) present in the composition of the invention and the amount thereof include an infrared spectrum method, a method of thermal decomposition and chromatography fractionation, a method of wet decomposition and chromatography fractionation, a heat decomposition and gas chromatography method, a method of heat decomposition and mass spectrum, a solid NMR method and the like.

Monofunctional Epoxy Resin

Examples of the monofunctional epoxy resin include an aliphatic monoglycidyl ether compound, a alicyclic monoglycidyl ether compound, an aromatic monoglycidyl ether compound, an aliphatic monoglycidyl ester compound, an aromatic monoglycidyl ester compound, an alicyclic monoglycidyl ester compound, a nitrogen-containing monoglycidyl ether compound, a monoglycidylpropylpolysiloxane compound, a monoglycidylalkane and the like. Other monofunctional epoxy resins may be used.

Aliphatic Monoglycidyl Ether Compound

Examples of the aliphatic monoglycidyl ether compound include an aliphatic monoglycidyl ether compound obtained by the reaction of a polyoxyalkylene monoalkyl ether having an alkyl group having from 1 to 6 carbon atoms or an alkenyl group with epichlorohydrin, an aliphatic monoglycidyl ether compound obtained by the reaction of an aliphatic alcohol and epichlorohydrin, and the like.

Examples of a polyoxyalkylene monoalkyl ether having an alkyl group having from 1 to 6 carbon atoms or an alkenyl group include ethylene glycol monoalkyl ether, diethylene glycol monoalkyl ether, triethylene glycol monoalkyl ether, polyethylene glycol monoalkyl ether, propylene glycol monoalkyl ether, dipropylene glycol monoalkyl ether, tripropylene glycol monoalkyl ether, polypropylene glycol monoalkyl ether and the like.

Examples of the aliphatic alcohol include n-butanol, isobutanol, n-octanol, 2-ethylhexyl alcohol, dimethylolpropane monoalkyl ether, methylolpropane dialkyl ether, glycerin dialkyl ether, dimethylolpropane monoalkyl ester, methylolpropane dialkyl ester, glycerin dialkyl ester and the like.

Alicyclic Monoglycidyl Ether Compound

Examples of the alicyclic glycidyl ether include an alicyclic monoglycidyl ether compound obtained by the reaction of an alicyclic alcohol having a saturated cyclic alkane group having from 6 to 9 carbon atoms with epichlorohydrin, and the like. Examples of the alicyclic alcohol include cyclohexanol and the like.

Aromatic Monoglycidyl Ether Compound

Examples of the aromatic monoglycidyl ether compound include an aromatic monoglycidyl ether compound obtained by the reaction of an aromatic alcohol with epichlorohydrin, and the like. Examples of the aromatic alcohol include phenol, methylphenol, ethylphenol, n-propylphenol, isopropylphenol, n-butylphenol, benzyl alcohol, t-butylphenol, xylenol, naphthol and the like.

Aliphatic or Aromatic Monoglycidyl Ester Compound

Examples of the aliphatic or aromatic monoglycidyl ester compound include an aliphatic monoglycidyl ester compound or an aromatic monoglycidyl ester compound obtained by the reaction of a monoalkyl aliphatic dicarboxylate ester or a monoalkyl aromatic dicarboxylate ester with epichlorohydrin, and the like.

Polyfunctional Epoxy Resin

The polyfunctional epoxy resin preferably contains from 2 to 6, in terms of weight average, of epoxy groups in one molecule of the polyfunctional epoxy resin. Specific examples thereof include an aliphatic polyglycidyl ether compound, an aromatic polyglycidyl ether compound, a trisphenol type polyglycidyl ether compound, a hydroquinone type polyglycidyl ether compound, a resorcinol type polyglycidyl ether compound, an aliphatic polyglycidyl ester compound, an aromatic polyglycidyl ester compound, an aliphatic polyglycidyl ether ester compound, an aromatic polyglycidyl ether ester compound, an alicyclic polyglycidyl ether compound, an aliphatic polyglycidyl amine compound, an aromatic polyglycidyl amine compound, a hydantoin type polyglycidyl compound, a biphenyl type polyglycidyl compound, a novolak type polyglycidyl ether compound, an epoxidated diene polymer and the like. Other polyfunctional epoxy resins may be used.

Aliphatic Polyglycidyl Ether Compound

Examples of the aliphatic polyglycidyl ether compound include aliphatic polyglycidyl ether compounds obtained by the reaction of a polyoxyalkylene glycol or a polyalcohol with epichlorohydrin, and the like.

Examples of the polyoxyalkylene glycol include ethylene glycol, diethylene glycol, triethylene glycol, polyethylene glycol, propylene glycol, dipropylene glycol, tripropylene glycol, polypropylene glycol and the like.

Examples of the polyalcohol include dimethylolpropane, trimethylolpropane, spiroglycol, glycerin and the like.

Aromatic Polyglycidyl Ether Compound

Examples of the aromatic polyglycidyl ether compound include aromatic polyglycidyl ether compounds obtained by the reaction of an aromatic diol with epichlorohydrin, and the like.

Examples of the aromatic diol include bisphenol A, bisphenol S, bisphenol F, bisphenol AD and the like.

Trisphenol Type Polyglycidyl Ether Compound

Examples of the trisphenol type polyglycidyl ether compound include trisphenol type polyglycidyl ether compounds obtained by the reaction of a trisphenol with epichlorohydrin.

Examples of the trisphenol include
4,4',4"-methylidenetrisphenol,
4,4',4"-methylidenetris(2-methylphenol),
4,4'-((2-hydroxyphenyl)methylene)-bis(2,3,6-trimethylphenol),
4,4',4"-ethylidenetrisphenol,
4,4'-((2-hydroxyphenyl)methylene)bis(2-methylphenol),
4,4'-((2-hydroxyphenyl)ethylene)bis(2-methylphenol),
4,4'-((4-hydroxyphenyl)methylene)bis(2-methylphenol),
4,4'-(4-hydroxyphenyl)ethylene)bis(2-methylphenol),
4,4'-((2-hydroxyphenyl)methylene)bis(2,6-dimethylphenol),
4,4'-((2-hydroxyphenyl)ethylene)bis(2,6-dimethylphenol),
4,4'-((4-hydroxyphenyl)methylene)bis(2,6-dimethylphenol),
4,4'-((4-hydroxyphenyl)ethylene)bis(2,6-dimethylphenol),
4,4'-((2-hydroxyphenyl)methylene)bis(3,5-dimethylphenol),
4,4'-((2-hydroxyphenyl)ethylene)bis(3,5-dimethylphenol),
4,4'-((3-hydroxyphenyl)methylene)-bis(2,3,6-trimethylphenol),
4,4'-((4-hydroxyphenyl)methylene)-bis(2,3,6-trimethylphenol),
4,4'-((2-hydroxyphenyl)methylene)bis(2-cyclohexyl-5-methylphenol),
4,4'-((3-hydroxyphenyl)methylene)bis(2-cyclohexyl-5-methylphenol),
4,4'-((4-hydroxyphenyl)methylene)bis(2-cyclohexyl-5-methylphenol),
4,4'-(1-(4-(1-(4-hydroxyphenyl)-1-methylethyl)phenolethylidene)bisphenol),
4,4'-((3,4-dihydroxyphenyl)methylene)bis(2-methylphenol),
4,4'-((3,4-dihydroxyphenyl)methylene)-bis(2,6-dimethylphenol),
4,4'-((3,4-dihydroxyphenyl)methylene)-bis(2,3,6-trimethylphenol),
4-(bis(3-cyclohexyl-4-hydroxy-6-methylphenyl)methyl)-1,2-benzenediol
and the like.

Hydroquinone Type Polyglycidyl Ether Compound

Examples of the hydroquinone type polyglycidyl ether compound include hydroquinone type polyglycidyl ether compounds obtained by the reaction of hydroquinone with epichlorohydrin, and the like.

Resorcinol Type Polyglycidyl Ether Compound

Examples of the resorcinol type polyglycidyl ether compound include resorcinol type polyglycidyl ether compounds obtained by the reaction of resorcinol with epichlorohydrin, and the like.

Aliphatic Polyglycidyl Ester Compound

Examples of the aliphatic polyglycidyl ester compound include aliphatic polyglycidyl ester compounds obtained by the reaction of an aliphatic dicarboxylic acid, represented by adipic acid, with epichlorohydrin, and the like.

Aromatic Polyglycidyl Ester Compound

Examples of the aromatic polyglycidyl ester compound include aromatic polyglycidyl ester compounds obtained by the reaction of an aromatic dicarboxylic acid with epichlorohydrin, and the like.

Examples of the aromatic dicarboxylic acid include isophthalic acid, terephthalic acid, pyromellitic acid and the like.

Aliphatic or Aromatic Polyglycidyl Ether Ester Compound

Examples of the aliphatic or aromatic polyglycidyl ether ester compound include aliphatic polyglycidyl ether ester compounds or aromatic polyglycidyl ether ester compounds obtained by the reaction of a hydroxydicarboxylic acid compound with epichlorohydrin, and the like.

Alicyclic Polyglycidyl Ether Compound

Examples of the alicyclic polyglycidyl ether compound include alicyclic polyglycidyl ether compounds represented by a dicyclopentadiene type polyglycidyl ether compound and the like.

Aliphatic Polyglycidyl Amine Compound

Examples of the aliphatic polyglycidyl amine compound include aliphatic polyglycidyl amine compounds obtained by the reaction of an aliphatic amine, represented by ethylenediamine, with epichlorohydrin, and the like.

Aromatic Polyglycidyl Amine Compound

Examples of the aromatic polyglycidyl amine compound include aromatic polyglycidyl amine compounds obtained by the reaction of an aromatic diamine, represented by diaminodiphenylmethane, aniline, meta-xylylenediamine and the like, with epichlorohydrin, and the like.

Hydantoin Type Polyglycidyl Compound

Examples of the hydantoin type polyglycidyl compound include hydantoin type polyglycidyl compounds obtained by the reaction of hydantoin or a derivative thereof with epichlorohydrin, and the like.

Novolak Type Polyglycidyl Ether Compound

Examples of the novolak type polyglycidyl ether compound include novolak type polyglycidyl ether compounds obtained by the reaction of a novolak resin derived from an aromatic alcohol, represented by phenol, cresol, naphthol and the like, and formaldehyde with epichlorohydrin, and the like. Modified novolak type polyglycidyl ether compounds obtained by the reaction of a modified aralkyl resin formed by combining, with a methylene bond, a phenol nucleus or a naphthol nucleus derived from phenol or naphthol and p-xylylene dichloride, and a para-xylene nucleus, with epichlorohydrin, and the like are also included.

Epoxidated Diene Polymer

Examples of the epoxidated diene polymer include epoxidated polybutadiene, epoxidated polyisoprene and the like.

It is preferred that the epoxy resin (1) in the sealant composition for a plastic liquid crystal display cell of the invention is a mixed composition of (1-1) an aliphatic and/or alicyclic epoxy resin and (1-2) an aromatic epoxy resin, the aliphatic and/or alicyclic epoxy resin (1-1) is one or a mixture of two or more selected from higher alcohol monoglycidyl ether, polyoxyalkylene glycol diglycidyl ether, 1,6-hexanediol diglycidyl ether, neopentyl glycol diglycidyl ether and glycerin triglycidyl ether, and the aromatic epoxy resin (1-2) is one or a mixture of two or more selected from the group consisting of a bisphenol A type epoxy resin or an alkylene oxide adduct type epoxy resin thereof, a bisphenol F type epoxy resin or an alkylene oxide adduct type epoxy resin thereof, a bisphenol S type epoxy resin, and a bisphenol AD type epoxy resin.

(2) Curing Agent

The mixing ratio of the curing agent (2) in the composition of the invention is from 10 to 50% by weight. When it is 10% by weight or more, the curing property of the epoxy resin (1) is improved, so as to obtain a sealant composition for a plastic liquid crystal display cell having high reliability. When it is 50% by weight or less, an unreacted matter of the curing agent can be suppressed from remaining, and the crosslinking density of the cured product and the seal adhesion reliability of the plastic liquid crystal display cell can be assured to good levels.

As for the curing agent (2) used in the sealant composition for a plastic liquid crystal display cell of the invention, a curing agent (2A) used in the case where the sealant composition for a plastic liquid crystal display cell is two-component type is one or a mixture of two or more selected from the following (2A-1) and (2A-2) having an ionic conductivity of an aqueous solution obtained by extraction separation by contact mixing with 10 times by weight of pure water at from 40 to 80° C. of 0.6 mS/m or less. A curing agent (2B) used in the case where the sealant composition for a plastic liquid crystal display cell of the invention is one-component type is one or a mixture of two or more selected from the following (2B-1) and (2B-2) having an ionic conductivity of an aqueous solution obtained by extraction separation by contact mixing with 10 times by weight of pure water at from 40 to 80° C. of 0.6 mS/m or less.

| (2A-1) | tetrafunctional mercapto compound |
| (2A-2) | modified polymercapto derivative |
| (2B-1) | micro-encapsulated imidazole compound |
| (2B-2) | methyl methacrylate adduct of an alicyclic diamine |

When the ionic conductivity is 0.6 mS/m or less, upon contacting a cured product of the sealant composition for a plastic liquid crystal display cell of the invention with a liquid crystal, migration of free ions from the cured product to the liquid crystal phase can be inhibited. Preferably, the ionic conductivity is 0.5 mS/m or less, and more preferably 0.3 mS/m or less.

As the curing agent (2A) for the two-component sealant composition for a plastic liquid crystal display cell of the invention, it is preferred to use the tetrafunctional mercapto compound (2A-1) solely or the modified polymercapto derivative (2A-2) solely.

(2A-1) to (2B-2) will be described in detail below.

(2A-1) Tetrafunctional Mercapto Compound

Examples of the tetrafunctional mercapto compound include those capable of being handled as a liquid at room temperature, such as pentaerythritol tetrakis(2-mercaptoacetonate), pentaerythritol tetrakis(3-mercaptopropionate), pentaerythritol tetrakis(2-isopropionate) and the like.

(2A-2) Modified Polymercapto Derivative

Examples of the modified polymercapto derivative include an epoxy resin modified polymercapto derivative, a diisocyanate compound modified polymercapto derivative and the like.

Examples of the epoxy resin modified polymercapto derivative include those obtained by reacting 1 equivalent in terms of active hydrogen of a bifunctional to tetrafunctional mercapto compound with from 0.01 to 0.3 equivalent, preferably from 0.05 to 0.25 equivalent, and further preferably from 0.1 to 0.2 equivalent, in terms of active isocyanate groups of a diisocyanate compound.

Examples of the bifunctional mercapto compound include ethylene glycol dimercaptopropionate, polyoxyethylene glycol dimercaptopropionate, propylene glycol dimercaptopropionate, polypropylene glycol dimercaptopropionate, tetramethylene glycol dimercaptopropionate, polyoxytetramethylene glycol dimercaptopropionate, neopentyl glycol dimercaptopropionate and the like.

Examples of the trifunctional mercapto compound include glycerin trimercaptopropionate, trimethylolpropane trimercaptopropionate, trismercaptoisocyanurate and the like.

Examples of the tetrafunctional mercapto compound include one or a mixture of two or more selected from the tetrafunctional mercapto compounds (2A-1).

It is preferred in the curing agent (2A) for the sealant composition for a plastic liquid crystal display cell of the invention, the tetrafunctional mercapto compound (2A-1) is pentaerythritol tetrakis(3-mercaptopropionate), and the modified polymercapto derivative (2A-2) is a modified polymercapto derivative obtained by reacting 1 equivalent in terms of active hydrogen of pentaerythritol tetrakis(3-mercaptopropionate) with from 0.01 to 0.3 equivalent in terms of active isocyanate groups of a diisocyanate compound and/or an isocyanate prepolymer thereof.

(2B-1) Micro-Encapsulated Imidazole Compound

Examples of the micro-encapsulated imidazole compound include micro-encapsulated products obtained by encapsulating N-cyanoethyl-2-ethyl-4-methylimidazole, 2-ethyl-4-methylimidazole, 2-methylimidazole, 2-n-pentadecylimidazole or the like as a core material with a minute shell.

(2B-2) Methyl Methacrylate Adduct of Alicyclic Diamine

Examples of the methyl methacrylate adduct of an alicyclic diamine (2B-2) include solid solutions having a softening point temperature of 50° C. or more and obtained by reacting 1 mole equivalent of an alicyclic diamine, represented by isophorone diamine, norbornane diamine and the like, with from 1 to 1.9 mole equivalents of a methyl (meta)acrylate, represented by methyl acrylate, methyl methacrylate, ethyl acrylate, ethyl methacrylate, and the like.

Examples of the method for obtaining the content of the curing agent (b) in the composition of the invention include a chromatography fractionation method, an infrared absorption spectrum method, a functionality analysis method, a solution/solid NMR (nuclear magnetic resonance spectrum) method and the like.

(3) Curing Accelerator

Examples of the curing accelerator (3) as a component of the composition of the invention include a 1,1-dialkyl urea derivative, an imidazole salt, an adduct of a polyamine compound and an epoxy resin, an adduct or a modified derivative thereof of an amine compound and a diisocyanate compound, a trisdimethylaminomethylphenol salt, a 1,8-diazabicyclo(5,4,0)-undecene-7 salt (hereinafter referred to as a DBU salt), a 1,5-diazabicyclo(4,3,0)-nonene-5 salt (hereinafter referred to as a DBN salt), a 6-dibutylamino-1,8-diazabicyclo(5,4,0)-undecene-7 salt (hereinafter referred to as a DADBU salt) and the like, and they may be used solely or as a mixture of two or more thereof.

What are preferred to be used as the curing accelerator (3) include those having low room temperature activity and high storage stability, and specifically, it is preferred that a 1,1-dialkyl urea derivative, a DBU salt or a DBN salt is used solely.

The using amount of the curing accelerator (3) in the composition of the invention is from 0.01 to 15% by weight, preferably from 0.1 to 15% by weight, and more preferably from 1 to 15% by weight, as a proportion occupied in the total epoxy resin composition. When it is 0.01% by weight or more, the low temperature curing property of the composition can be obtained. When it is 15% by weight or less, the coating workability of the composition can be obtained.

As the curing accelerator (3), such a compound is used that has a total content of an alkali metal obtained by an atomic absorption spectroscopy of a wet decomposition product of 50 ppm or less, more preferably 30 ppm or less, and further preferably 15 ppm or less. According to the configuration, upon contacting a cured product of the composition of the invention with a liquid crystal, migration of free ions from the cured product to the liquid crystal phase can be suppressed. As a purification method for obtaining a total content of an alkali metal of 50 ppm or less, known methods, such as a solvent extraction method and the like, can be used.

Specific examples of the curing accelerator (3) will be described below.

1,1-Dialkyl Urea Derivative

Examples of the 1,1-dialkyl urea derivative include
3-(p-chlorophenyl)-1,1-dimethyl urea,
3-(o,p-dichlorophenyl)-1,1-dimethyl urea,
2,4-(bis(1,1-dimethyl urea))toluene,
2,6-(bis(1,1-dimethyl urea))toluene
and the like.

Imidazole Salt

Examples of the imidazole salt include an anhydrous pyromellitic acid salt of 2-ethyl-4-methylimidazole, an anhydrous tetrahydrophthalic acid salt of 2-methylimidazole, an anhydrous tetrahydrophthalic acid salt of 2-ethyl-4-methylimidazole, and the like.

Adduct of Polyamine Compound and Epoxy Resin

Examples of the adduct of a polyamine compound and an epoxy resin include adducts derived from a known polyamine compound and a known epoxy resin, and the like. Specifically, an adduct obtained by reacting an adduct of an epoxy resin and a polyamine with a compound having two or more acidic hydroxyl groups can be exemplified. Examples of the compound having two or more acidic hydroxyl groups include a phenol resin, a modified phenol resin, a polycarboxylic acid and the like.

Adduct or Modified Derivative thereof of Amine Compound and Diisocyanate Compound Examples of the adduct of an amine compound and a diisocyanate compound include adducts obtained by reacting a known primary or secondary amine compound with diisocyanate, and the like.

Examples of the modified derivative of the adduct of an amine compound and a diisocyanate compound include a adduct derivative obtained by reacting under heat N,N-dialkylaminoalkylamine, a cyclic amine and diisocyanate, a composition obtained in such a manner that a diisocyanate compound is uniformly made in contact with a surface of particles of the adduct derivative in the form of powder having a softening point of 60° C. or more and containing a tertiary amino group, and the like.

Trisdimethylaminomethylphenol Salt

Examples of the trisdimethylaminomethylphenol salt include a trisdimethylaminomethylphenol octylic acid salt, a trisdimethylaminomethylphenol oleic acid salt, a trisdimethylaminomethylphenol formate and the like.

DBU Salt

Examples of the DBU salt include a DBU phenol salt, a DBU polyphenol compound salt, a DBU polyphenol salt, a DBU octylic acid salt, a DBU oleic acid salt, a DBU formate and the like.

DBN Salt

Examples of the DBN salt include a DBN phenol salt, a DBN polyphenol compound salt, a DBN polyphenol salt, a DBN octylic acid salt, a DBN oleic acid salt, a DBN formate, a DBN paratoluenesulfonic acid salt and the like.

DADBU Salt

Examples of the DADBU salt include a DADBU phenol salt, a DADBU polyphenol compound salt, a DADBU polyphenol salt, a DADBU octylic acid salt, a DADBU oleic acid salt, a DADBU formate, a DADBU paratoluenesulfonic acid salt and the like.

Examples of the method for measuring the content proportion of the curing accelerator (3) in the composition of the invention include a chromatography fractionation method, a water extraction fractionation method, an infrared absorption spectrum method, a phosphorous elemental analysis method, and the like.

It is preferable that the curing accelerator (3) in the sealant composition for a plastic liquid crystal display cell of the invention is at least one selected from an alkyl urea derivative, a trisdimethylaminomethylphenol salt and 1,8-diazabicyclo(5,4,0)undecene-7 salt.

Furthermore, it is preferable that the alkyl urea derivative is at least one selected from
3-(p-chlorophenyl)-1,1-dimethyl urea,
3-(o,p-dichlorophenyl)-1,1-dimethyl urea,
2,4-(bis(1,1-dimethyl urea))toluene and
2,6-(bis(1,1-dimethyl urea))toluene.

(4) Inorganic Filler

As the inorganic filler (4) used in the invention, any inorganic filler may be used as far as it is generally used in the field of electronic materials. Specific examples thereof include calcium carbonate, magnesium carbonate, barium sulfate, magnesium sulfate, aluminum silicate, zirconium silicate, iron oxide, titanium oxide, aluminum oxide (alumina), zinc oxide, silicon dioxide, potassium titanate, kaolin, talc, asbestos powder, quartz powder, mica, glass fibers and the like.

What are preferred among them are high purity silica and/or high purity alumina or titanium oxide. It is preferred to use high purity silica and/or high purity alumina or titanium oxide having a total content of an alkali metal obtained by an atomic absorption spectroscopy of a wet decomposition product of 50 ppm or less, more preferably 30 ppm or less, and further preferably 15 ppm or less. According to the configuration, upon contacting a cured product of the composition of the invention with a liquid crystal, migration of free ions from the cured product to the liquid crystal phase can be suppressed. Examples of a purification method for obtaining a total content of an alkali metal of 50 ppm or less include an ion exchange purification method and the like, and the method may be used after forming aqueous solutions in the state of production raw materials.

The inorganic filler (4) preferably has a 99% by weight particle diameter ($d^{99}$) on a weight accumulating curve obtained by a laser particle diameter measuring device of a wavelength of 632.8 nm of 5 μm, and more preferably a 50% by weight particle diameter ($d^{50}$) on the weight accumulating curve in a range of from 0.005 to 1 μm. When an inorganic filler (4) having a $d^{99}$ of 5 μm or less is used, it is preferred since the dimensional stability of the gap width of the liquid crystal panel is further improved.

The content ratio of the inorganic filler (4) in the composition of the invention is preferably from 5 to 50% by weight, and more preferably from 10 to 40% by weight. When it is contained in 5% by weight or more, workability on screen printing or dispenser coating can be improved. When it is contained in 50% by weight or less, the flowability of the composition can be assured, and thinning upon screen printing and clogging of a dispenser can be suppressed, whereby the coating operation becomes simple.

It is preferred that the inorganic filler (4) is used after subjecting to graft modification with the epoxy resin (1) and the silane coupling agent (5) described later.

The graft modification may be carried out either a part or the whole of the inorganic filler (4). In general, it is preferred that from 1 to 50 parts by weight of at least one of the epoxy resin (1) and the silane coupling agent (5) is graft modified on 100 parts by weight of the inorganic filler (4). The ratio of occurrence of graft modification, i.e., the graft ratio, is preferably from 1 to 50, which is expressed by a weight increasing ratio obtained by a repeating solvent washing method described later.

The repeating solvent washing method herein is a method for obtaining a graft ratio in the following manner. Wet filtering of a sample, which is an inorganic filler that is partly or totally graft modified, with from 10 to 20 times the sample of the following solvent is repeated by 5 to 10 times. The epoxy resin (1) and the silane coupling agent (5) that have not been subjected to graft modification are washed out by the filtration. Examples of the solvent include acetone, methyl ethyl ketone, methanol, ethanol, toluene, xylene and the like, which are good solvents for the epoxy resin (1) or the silane coupling agent (5). The sample remaining after the filtration is then dried and measured for the weight thereof. This weight is a dry weight of the graft-modified inorganic filler (4). The weight increasing ratio is obtained from the measured value by the following calculating equation. The graft ratio may be obtained by a Soxhlet continuous extracting method by using the solvent instead of the repeating solvent washing method.

Graft ratio=(((dry weight of graft modified inorganic filler)−(dry weight of inorganic filler before graft modification))/(dry weight of inorganic filler before graft modification))×100

Examples of the method for obtaining the content ratio of the inorganic filler (4) as a component of the composition of the invention include a filtration fractionation method, an X-ray diffraction spectrum method, an elemental analysis method, a heat burning residue method, a method of wet decomposition and atomic absorption analysis, a method of analysis of an image obtained by observing with an electron microscope, and the like.

(5) Silane Coupling Agent

The mixing ratio of the silane coupling agent (5) in the composition of the invention is preferably from 0.1 to 5% by weight, and more preferably from 0.5 to 3% by weight. When it is 0.1% by weight or more, adhesion property to a glass substrate can be assured. The reason why it is 5% by weight or less is that no further conspicuous effect can be obtained even when it exceeds 5% by weight.

Examples of the silane coupling agent (5) include a trialkoxysilane compound, a methyldialkoxysilane compound and the like. Specific examples thereof include γ-glycidoxypropylmethyldimethoxy silane, γ-glycidoxypropyltrimethoxy silane, γ-glycidoxypropylmethyldiethoxy silane, γ-glycidoxypropyltriethoxy silane, γ-aminopropylmethyldimethoxy silane, γ-aminopropyltrimethoxy silane, γ-aminopropylmethyldimethoxy silane, γ-aminopropyltriethoxy silane, N-aminoethyl-γ-aminopropylmethyldimethoxy silane, N-aminoethyl-γ-aminopropyltrimethoxy silane, N-aminoethyl-γ-aminopropyltriethoxy silane, N-phenyl-γ-aminopropyltrimethoxy silane, N-phenyl-γ-aminopropyltriethoxy silane, N-phenyl-γ-aminopropylmethyldimethoxy silane, N-phenyl-γ-aminopropylmethyldiethoxy silane, γ-mercaptopropylmethyldimethoxy silane, γ-aminopropyltrimethoxy silane, γ-mercaptopropylmethyldiethoxy silane, γ-mercaptopropyltriethoxy silane, γ-isocyanatepropylmethyldiethoxy silane, γ-isocyanatepropyltriethoxy silane, and the like, and they may be used solely or by mixing two or more of them.

Examples of the method for determining the silane coupling agent (5) in the composition of the invention and the content ratio thereof include a solvent extraction fractionation method, an NMR spectrum identification method, a gas chromatography method, a distillation fractionation method and the like. Examples of the method for determining the silane coupling agent (5) in a cured product of the composition of the invention and the content ratio thereof include a method of heat decomposition, gas chromatography and mass spectrum, a solid NMR method and the like.

(6) Rubbery Polymer Fine Particles

The rubbery polymer fine particles (6) are those having a softening point temperature obtained by a torsional braid analyzer (hereinafter referred to as a TBA) called as a torsion pendulum method of 0° C. or less, and they preferably contains particles having an average particle diameter of primary particles obtained with an electron microscope of from 0.01 to 5 μm in an amount of from 1 to 25% by weight, more preferably from 3 to 22.5% by weight, and further preferably from 5 to 20% by weight. When it is used in an amount of 1% by weight or more, the adhesion durability reliability after a water resistant test at 60 to 80° C. of the plastic liquid crystal display cell using the composition of the invention as a sealant of the liquid crystal panel can be assured. When it is 25% by weight or less, the heat resistant rigidity required for the cured product can be assured.

When the softening point temperature of the rubbery polymer fine particles (6) is 0° C. or less, the adhesion reliability at low temperatures is further improved. When the primary particle diameter of the rubbery polymer fine particles (6) is 5 μm or less, the gap of the plastic liquid crystal display cell can be thin, whereby the using amount of an expensive liquid crystal can be suppressed, and the response speed of the liquid crystal can be improved. The average particle diameter of the primary particles of the rubbery polymer fine particles (6) is more preferably from 0.05 to 2 μm.

Examples of the rubbery polymer fine particles (6) in the sealant composition for a plastic liquid crystal display cell of the invention include silicone rubber fine particles having a softening point temperature of −30° C. or less and a primary particle diameter in a range of from 0.01 to 3 μm, and/or acrylic rubber fine particles or polyolefin rubber fine particles, and more preferably, the rubbery polymer particles (6) are crosslinked rubbery particles.

Other preferred examples thereof include rubbery polymer fine particles (6) that have a primary particle diameter of from 0.1 to 1 μm and are crosslinked rubber particles. The primary particle diameter herein means an average particle diameter of primary particles.

Known rubbery polymer fine particles may be used as the rubbery polymer fine particles (6) as far as the softening point thereof is 0° C. or less even though they do not satisfy the foregoing conditions. Specific examples thereof include rubbery polymer fine particles of acrylic rubber, rubbery polymer fine particles of silicone rubber, rubbery polymer fine particles of conjugated diene rubber, rubbery polymer fine particles of olefin rubber, rubbery polymer fine particles of polyester rubber, rubbery polymer fine particles of urethane rubber, composite rubber, rubbery polymer fine particles having functional groups reacting with a composite rubber and an epoxy group, and the like. It is preferred that the rubbery polymer fine particles have functional group that reacts with an epoxy group. The rubbery polymer fine particles may be used solely or as a mixture of two or more thereof. Specific examples of the rubbery polymer fine particles will be described below.

Rubbery Polymer Fine Particles of Acrylic Rubber

Examples of the rubbery polymer fine particles of acrylic rubber include fine particles obtained by drying a core/shell emulsion having a core part formed with acrylic rubber, a resin composition obtained by non-aqueous dispersion polymerization of an acrylic monomer in an epoxy resin, a resin composition obtained in such a manner that an acrylic rubber polymer solution obtained by introducing functional groups that react with an epoxy group is separately prepared and put in or added dropwise in an epoxy resin, followed by mechanical mixing, and then the mixture is subjected to solvent removal or grafting, whereby acrylic rubber fine particles are stably dispersed in the epoxy resin, and the like.

Rubbery Polymer Fine Particles of Silicone Rubber

Examples of the rubbery polymer fine particles of silicone rubber include a resin composition obtained in such a manner that double bonds are introduced into powder silicone rubber fine particles and an epoxy resin, the double bonds are reacted with a silicone macromonomer having a one-side acrylate group capable of reacting with the double bonds, and then vinyl silicone and hydrogen silicone are charged and subjected to dispersion polymerization, and the like.

Rubbery Polymer Fine Particles of Conjugated Diene Rubber

As the rubbery polymer fine particles of conjugated diene rubber, known fine particles may be used, and specific examples thereof include conjugated diene rubbery polymer fine particles obtained by polymerizing or copolymerizing monomers, such as 1,3-butadiene, 1,3-pentadiene, isoprene, 1,3-hexadiene, chloroprene, and the like. More specific examples thereof include a copolymer of butadiene and acrylonitrile, a copolymer of butadiene and acrylonitrile having a carboxyl group at an end thereof, a copolymer of butadiene and acrylonitrile having an amino group at an end thereof, and the like.

Rubbery Polymer Fine Particles of Olefin Rubber

Examples of the rubbery polymer fine particles of olefin rubber include fine particles formed with an amorphous homopolymer of ethylene, propylene, 1-butene, 2-butene, isobutene or the like, or a copolymer or a terpolymer with other monomers capable of being copolymerized, a composition thereof, and the like. It is also possible to use a resin composition obtained in such a manner that after obtaining those commercially available in the form of olefin rubber latex, they are subjected to a dehydration treatment in an epoxy resin, so as to disperse and stabilize the olefin rubber in the epoxy resin.

Rubbery Polymer Fine Particles of Polyester Rubber

The rubbery polymer fine particles of polyester rubber are fine particles formed with a rubbery polymer, in which polyester bonds are contained in the polymer skeleton. Specific examples thereof include a low softening point polyester resin derived, in the presence of a polyalcohol compound of a triol or higher depending on necessity, from at least one diol component selected from liquid polysiloxanediol, liquid polyolefindiol, polypropylene glycol, polybutylene glycol and the like, and at least one dibasic acid selected from adipic acid, maleic acid, succinic acid, phthalic acid and the like, a low softening point polyester resin using an acid anhydride instead of the dibasic acid, a low softening point polyester resin derived from a hydroxypolycarboxylic acid, and the like.

Rubbery Polymer Fine Particles of Urethane Rubber

The rubbery polymer fine particles of urethane rubber are fine particles formed with a rubbery polymer, in which urethane bonds and/or urea bonds are contained in the rubbery polymer skeleton. Specific examples thereof include rubbery polyurethane obtained by reacting, in the presence of a polyalcohol compound of a triol or higher depending on necessity, a diol component formed with at least one selected from liquid polysiloxanediol, liquid polyolefindiol, polypropylene glycol, polybutylene glycol and the like, with a diisocyanate compound represented by hexamethylenediisocyanate, isophorone diisocyanate, tolylene diisocyanate, diphenylmethane diisocyanate, norbornane diisocyanate and the like, rubbery polyurethane obtained by reacting, in the presence of a polyalcohol compound of a triol or higher depending on necessity, at least one long-chain diamine component selected from liquid polysiloxanediamine, liquid polyolefindiamine, polypropylene glycol diamine and the like, with a known diisocyanate compound represented by hexamethylenediisocyanate, isophorone diisocyanate, tolylene diisocyanate, diphenylmethane diisocyanate, norbornane diisocyanate and the like, and the like.

Composite Rubber Fine Particles

Examples of the composite rubber fine particles include fine particles formed with a graft polymer and/or a block polymer, a core/shell polymer, a double layer polymer or the like formed with two or more of the acrylic series, the silicone series, the conjugated diene series, the olefin series, the polyester series and the urethane series described in the foregoing, and the like.

Rubbery Polymer Fine Particles having Functional Groups Reacting with Epoxy Group Examples of the rubbery polymer fine particles having functional groups reacting with an epoxy group include those obtained by introducing functional groups reacting with an epoxy group into fine particles of the acrylic series, the silicone series, the conjugated diene series, the olefin series, the polyester series or the urethane series described in the foregoing, and the like.

In the rubbery polymer fine particles having functional groups reacting with an epoxy group, it is preferred that the weight ratio of the structure derived from a monomer having functional groups reacting with an epoxy group occupied in the rubbery polymer is from 0.1 to 25% by weight. When the content of the repeating structure derived from a monomer having functional groups reacting with an epoxy group is from 0.1 to 25% by weight, the adhesion property of the resulting sealant composition for a plastic liquid crystal cell is remarkably improved.

Examples of the functional group reacting with an epoxy group include a mercapto group, an amino group, an imino group, a carboxyl group, an acid anhydride group, an epoxy group, a hydroxyl group and the like.

In the rubbery polymer having functional groups reacting with an epoxy group, it is preferred that at least one of the functional groups is introduced in an amount of from 0.01 to 25% by weight, and more preferably from 0.1 to 10% by weight.

Examples of the method for introducing the functional groups include a random copolymerization method of a monomer containing the functional groups and a monomer constituting the main chain polymer, an alternating copolymerization method, a condensation polymerization method, an addition polymerization method, an introducing method by core/shell polymerization, an ion adsorption introduction method, a swelling and impregnating introduction method, a method of graft polymerizing on a polymer forming rubbery particles, and the like. Among these, the copolymerization method and the graft polymerization method are preferred since the necessary functional groups can be introduced in the vicinity of the surface of the rubbery polymer fine particles in high efficiency with a small amount.

In the composition of the invention, it is preferred that the rubbery polymer fine particles (6) maintain the form of particles in the epoxy resin.

Examples of the method for confirming that the rubbery polymer fine particles (6) are present in the form of particles in the epoxy resin (1) include a method, in which a mixture of the epoxy resin (1) having no turbidity and the rubbery polymer fine particles (6) is prepared, and the mixture is observed with an optical microscope to confirm the presence of the rubbery polymer fine particles, a method, in which a micro-cross section of a cured product obtained by adding a necessary amount of a polymercaptan room temperature curing agent or a polyamine room temperature curing agent to the mixture is dyed and sensitized with osmic acid and observed to confirm with a scanning electron microscope (TEM) or a transmission electron microscope (SEM), a method, in which a micro-layer of the cured product is subjected to microscope IR measurement to confirm, and the like.

Examples of the method for determining the rubbery polymer particles (6) in the composition of the invention and the amount and particle diameter thereof include a method, in which a piece of a cured product of the composition of the invention is dyed and sensitized with osmic acid and observed with a TEM or an SEM to determine, a method, in which a piece of the cured product obtained in the same manner is subjected to SEM observation, and simultaneously an elemental analysis image is obtained, to carry out identification and quantitative determination, so as to determine, a method, in which a surface of a cured product is selectively etched in a known method and then observed with a TEM to determine, a method, in which the micro-layer is measured for a microscope infrared absorption spectrum (microscope IR) to determine, a method, in which the micro-layer is irradiated with a heat ray, and the components of a gas formed by decomposition are identified to determine, a method, in which the weight ratio is obtained from the volume weight ratios of the micro-layer through conversion to determine, and the like.

Examples of the method for obtaining the content ratio of the rubbery polymer fine particles (6) contained in the sealant composition for a plastic liquid crystal display cell having been prepared include a method, in which the rubbery polymer fine particles (6) and the amount thereof are determined from the absorbance of the particular absorption spectrum of the rubbery polymer fine particles in an infrared absorption spectrum (IR) of the liquid crystal sealant composition, a method, in which the species of the rubbery polymer fine particles identified through the IR analysis is obtained, and they are obtained from the attenuation ratio of the modulus (G") in a low temperature region by TBA measurement, which is an indexical amount of the effects that are apparently exerted by the rubbery polymer fine particles, a heat decomposition gas chromatography method, an elemental analysis method, a method, in which the occupied volume of the rubbery polymer fine particles is obtained from plural SEM photographs of a cured product, and they are obtained by specific gravity conversion, a method obtaining from heat decomposition gas analysis, and the like.

In the sealant composition for a plastic liquid crystal display cell of the invention, the rubbery polymer fine particles (6) may be previously grafted with the epoxy resin (1) or may not be grafted.

(7) High Softening Point Acrylic Polymer Fine Particles

As the sealant composition for a plastic liquid crystal display cell of the invention, such a sealant composition is preferred that is obtained by adding from 0.1 to 25 parts by weight of high softening point acrylic polymer fine particles (7) described below in 100 parts by weight of a sealant composition for a plastic liquid crystal display cell containing the foregoing (1) to (6). When 0.1 part by weight or more of the high softening point acrylic polymer fine particles (7) is used, seal leak and effusion are difficult to occur by an adhesion process using a vacuum sheet heat press adhesion or rigid sheet heat press adhesion method. When 25% by weight or less of the high softening point acrylic polymer is used, workability on providing gaps is obtained.

The high softening point acrylic polymer fine particles (7) are such high softening point acrylic polymer fine particles that has a softening point temperature obtained by TBA of 50° C. or more and an average particle diameter of primary particles obtained by observing with an electron microscope of 2 μm or less. The average particle diameter of primary particles is preferably from 0.01 to 1 μm, and more preferably from 0.2 to 0.5 μm. When the average particle diameter of primary particles of the high softening point acrylic polymer fine particles (7) is 2 μm or less, workability on providing gaps can be obtained.

The high softening point acrylic polymer particles (7) may be either a crosslinking type or a non-crosslinking type, and the crosslinking type is preferred, with high softening point acrylic polymer fine particles having a micro-crosslinking structure being the most preferred.

The high softening point acrylic polymer fine particles having a micro-crosslinking structure can be produced when the amount of a crosslinking monomer is from 0.1 to 50% by weight, preferably from 1 to 3% by weight, based on the total monomers upon producing the polymer.

A gel fraction is one index of the micro-crosslinking degree. This index is obtained in such a manner that 10 g of the high softening point polymer fine particles are dispersed in 50 g of methyl carbitol as a solvent and filtered after stirring at 25° C. for one hour, so as to obtain the amount of the filtrate and the content (dissolved amount) of the polymer in the filtrate, which are then applied to the equation:

Gel fraction (%)=(dissolved amount/10 g)×100

The gel fraction index is preferably from 0 to 50%, and more preferably from 0 to 5%.

The high softening point acrylic polymer fine particles preferably have a solubility parameter (SP value) calculated from the chemical structural formula in a range of from 9 to 11, and more preferably in a range of from 9.3 to 10.5.

Examples of the high softening point acrylic polymer fine particles (7) include a polymer having polymethyl methacrylate as a main component of a micro-crosslinking type obtained by copolymerizing with from 0.1 to 50% by weight of a crosslinking monomer, a polymethyl methacrylate polymer having an ionomer structure in an amount of from 0.1 to 50% by weight, and the like. In the high softening point acrylic polymer fine particles, it is preferred that one functional group such as an epoxy group, an amino group, an imino group, a mercapto group, a carboxyl group and the like is introduced on the surface of the particles.

More preferably, they have a softening point temperature of from 60 to 150° C. and a primary particle diameter of from 0.01 to 3 µm.

In the sealant composition for a plastic liquid crystal display cell of the invention, the rubbery polymer fine particles (6) and the high softening point acrylic polymer fine particles (7) may be previously formed as a composite, and a so-called core/shell composite fine particles A of the rubbery polymer fine particles (6) and the high softening point acrylic polymer fine particles (7), in which the rubbery polymer fine particles (6) form a core phase, and the high softening point acrylic polymer fine particles (7) form a shell phase, are included. A core/shell composite fine particles B of the inverted structure, in which the high softening point acrylic polymer fine particles (7) form a core phase, and the rubbery polymer fine particles (6) form a shell phase, are also included. Upon forming the composite, it is preferred to use the former core/shell composite fine particles A.

In the core/shell composite fine particles A having the rubbery polymer fine particles (6) as a core phase, the weight ratio of the core phase and the shell phase is preferably from 0.3 to 2 for the shell phase where the core phase is 1. As an example of the core/shell high softening point polymer fine particles A, "Zeon F-351", a trade name, produced by Nippon Zeon Co., Ltd. is easily available and can be preferably used.

Examples of the method for determining the high softening point acrylic polymer fine particles (7) in the sealant composition for a plastic liquid crystal display cell and the amount thereof include the same methods as the measurement methods for the rubbery fine particles.

(8) Wax

In the sealant composition for a plastic liquid crystal display cell of the invention, it is preferred to use wax (8) depending on necessity. The using ratio of the wax (8) is preferably from 0.1 to 5 parts by weight per 100 parts by weight of the sealant composition for a plastic liquid crystal cell of the invention.

Examples of the method for obtaining the content ratio of the wax (8) in the sealant composition for a plastic liquid crystal display cell include a heat decomposition gas chromatography method, a solid nuclear magnetic resonance spectrum method, a method of hydrocarbon solvent extraction and fractional quantitative determination, and the like.

It is the most preferred that the wax (8) is contained in an amount of from 0.1 to 5 parts by weight per 100 parts by weight of the sealant composition for a plastic liquid crystal display cell formed with one of the composition containing from (1) to (6) and the composition containing from (1) to (7). When the mixing amount of the wax is from 0.1 to 5 parts by weight per 100 parts by weight of the sealant composition, the water vapor permeability characteristics at 60° C. of the cured product under a high temperature and high humidity environment of 60° C. and a relative humidity of 95% or more can be further decreased. According thereto, a plastic liquid crystal display cell having high durability can be produced.

As the wax (8), any type of wax may be used. Specific examples thereof include animal natural wax, vegetable natural wax, mineral natural wax, petroleum wax, synthetic hydrocarbon wax, modified wax, hydrogenated wax and the like. Among these, wax having a melting point of from 70 to 150° C. is preferred, and carnauba wax, microcrystalline wax, Fischer-Tropsch wax and modified Fischer-Tropsch wax are particularly preferred.

In the sealant composition for a plastic liquid crystal display cell of the invention containing the wax (8), it is preferred that the wax is present as independent primary particles in the state before curing the sealant composition for a plastic liquid crystal display cell, and the average particle diameter of the primary particles obtained by observation with an electron microscope or an optical microscope is preferably in a range of from 0.01 to 5 µm, and more preferably in an range of from 0.01 to 3 µm.

More specific examples of the wax (8) will be shown below. Examples of the animal natural wax include yellow beeswax, whale wax, shellac wax and the like. Examples of the vegetable natural wax include carnauba wax, oricury wax, candelilla wax, wood wax, cane wax and the like. Examples of the mineral natural wax include montan wax, ozokerite, ceresin and the like. Examples of the petroleum wax include paraffin wax, microcrystalline wax and the like. Examples of the synthetic hydrocarbon wax include Fischer-Tropsch wax and a derivative thereof, polyethylene wax and a derivative thereof, polypropylene wax and a derivative thereof, and the like. Examples of the modified wax include oxide wax, montan wax, acid-modified wax and the like. Examples of the hydrogenated wax include amide wax, such as stearic acid amide wax and the like, polyester wax, opal wax and the like. In particular, the most preferred wax is carnauba wax.

(9) Controlling Agent for Providing Gaps

The controlling agent for providing gaps (9) is such a substance that can arbitrarily and accurately control the gap width of the liquid crystal display cell to a range of from 3 to 7 µm, and any organic substance and inorganic substance can be used as far as it has such a function.

The controlling agent for providing gaps (9) is preferably used depending on necessity in an amount of from 0.1 to 5 parts by weight, and more preferably from 0.5 to 2.5 parts by weight, per 100 parts by weight of the sealant composition for a plastic liquid crystal display cell of the invention.

Examples of the method for obtaining the content ratio of the controlling agent for providing gaps (9) in the sealant composition for a plastic liquid crystal display cell include an SEM image analysis method, a TEM image analysis method, a classification filtration method, a heat decomposition gas chromatography method, a method of fluorescent X-ray diffraction of heat decomposition residue, an elemental analysis method and the like.

Examples of the controlling agent for providing gaps (9) include inorganic particles or thermosetting polymer particles that are not modified, dissolved or swelled by the epoxy resin (1) and have a vertical and horizontal symmetry, such as true spheres, soccer ball-like particles, bar-like fibers and the like.

Examples of the inorganic particles as the controlling agent for providing gaps (9) include true spherical silica particles, true spherical alumina particles, glass short fibers, metallic short fibers, metallic powder and the like. The inorganic particles are preferred since the gap accuracy can be controlled with high accuracy.

Examples of the controlling agent for providing gaps (9) of the organic substance include thermosetting polystyrene true spherical particles, phenol resin thermosetting particles, benzoguanamine resin thermosetting particles and the like.

(10) Electroconductive Beads

Examples of the electroconductive beads (10) include electroconductive beads having an average particle diameter of from 3 to 10 μm with a maximum particle diameter of 10 μm or less and a minimum particle diameter of 0.1 μm or more, and the like.

It is preferred that from 1 to 15 parts by weight of the electroconductive beads are contained in 100 parts by weight of the plastic resin composition of the invention, and according to the configuration, a function of anisotropic electroconductivity can be imparted. The use in an amount of 1 part by weight or more can impart a vertical conductive function. When the amount is less than 15 parts by weight, assurance of insulating characteristics between the side (right and left) electrodes is improved. It is more preferably from 2 to 10 parts by weight.

Examples of the electroconductive beads (10) include noble metal particles, noble metal alloy particles, base metal particles and base metal alloy particles, as well as metal-coated organic substance particles, metal-coated insulating inorganic particles and the like.

Noble Metal Particles

Examples of the noble metal of the noble metal particles include gold, silver, platinum and the like.

Noble Metal Alloy Particles

Examples of the noble metal alloy of the noble metal alloy particles include a silver-copper alloy, a gold-copper alloy, a gold-silver alloy, a platinum-silver alloy, a gold-platinum alloy, a gold-nickel alloy, a silver-nickel alloy and the like.

Base Metal Particles

Examples of the base metal of the base metal particles include copper, nickel, tin, tungsten and the like.

Base Metal Alloy Particles

Examples of the base metal alloy of the base metal alloy particles include a copper-nickel alloy, a copper-tin alloy, solder and the like.

Metal-coated Organic Substance Particles

Examples of the metal-coated organic substance particles include those obtained by forming an electroconductive metallic film formed with the foregoing noble metals and the like on organic polymer particles represented by polystyrene and polymethyl methacrylate. Examples of the commercially available products include "Micropearl AU Series", a trade name, produced by Sekisui Fine Chemicals Co., Ltd. and the like.

Metal-coated Insulating Inorganic Particles

Examples of the metal-coated insulating inorganic particles include those obtained by forming the electroconductive metallic film on inorganic substance particles of high insulating property represented by mica and glass beads, and the like.

As for the electroconductive beads (10), such embodiments are particularly preferred from the standpoint of assuring the primary dispersion stability thereof that the metal-coated organic substance particles are contained in an amount of from 1 to 7% by volume in terms of the ratio occupied in the sealant composition for a plastic liquid crystal display cell of the invention. In particular, it is the most preferred in the sealant composition for a plastic liquid crystal display cell of the invention that the electroconductive beads (10) have an organic polymer as a core and are formed with a metallic coating phase of at least one selected from gold, silver, a gold-copper alloy, silver-copper alloy, nickel, alloys thereof and the like.

It is preferred that the electroconductive beads (10) have an average particle diameter in the foregoing range. With those having an average particle diameter of 1 μm or less, it is difficult to obtain good vertical electroconductive characteristics when the electroconductive particles remain between the electrodes, and when those having an average particle diameter or a maximum particle diameter exceeding 10 μm are used, they are liable to be a factor of short circuits.

Examples of the method for determining the electroconductive beads (electroconductive particles) in the sealant composition for a plastic liquid crystal display cell or the cured product and the amount ratio thereof include an elemental analysis method, a TEM or SEM image analysis method of the cured product, a filtration fractionation method and the like.

(11) Solvent

In the sealant composition for a plastic liquid crystal display cell of the invention, from 1 to 25 parts by weight of the solvent (11) that is compatible with the epoxy resin, has a boiling point in a range of from 150to 220° C. and is inactive to an epoxy group may be added to 100 parts by weight of the composition. By containing the solvent, the screen printing suitability and the wetting property to the adherend can be improved. Preferred examples thereof include a high boiling point solvent having a boiling point in a range of from 160 to 200° C.

Examples of the solvent (11) include a ketone solvent, such as cyclohexane, an ether solvent, an acetate solvent and the like.

Examples of the ether solvent include ethylene glycol monomethyl ether, ethylene glycol monoethyl ether, ethylene glycol monopropyl ether, ethylene glycol monobutyl ether, ethylene glycol monophenyl ether, ethylene glycol dimethyl ether, ethylene glycol diethyl ether, ethylene glycol dipropyl ether, ethylene glycol dibutyl ether, ethylene glycol diphenyl ether, diethylene glycol monomethyl ether, diethylene glycol monoethyl ether, diethylene glycol monopropyl ether, diethylene glycol monobutyl ether, diethylene glycol monophenyl ether, diethylene glycol dimethyl ether, diethylene glycol diethyl ether, diethylene glycol dipropyl ether, diethylene glycol dibutyl ether, diethylene glycol diphenyl ether and the like.

Examples of the acetate solvent include ethylene glycol monoacetate, ethylene glycol monomethyl ether acetate, ethylene glycol monoethyl ether acetate, ethylene glycol monopropyl ether acetate, ethylene glycol monobutyl ether acetate, ethylene glycol monophenyl ether acetate, ethylene glycol diacetate, diethylene glycol monomethyl acetate, diethylene glycol monoethyl acetate, diethylene glycol monobutyl ether acetate, diethylene glycol diacetate and the like.

As preferred examples of the solvent (11), at least one selected from ethylene glycol monobutyl ether, ethylene glycol monomethyl ether acetate, diethylene glycol dimethyl ether, propylene glycol monomethyl ether, propylene glycol monomethyl ether acetate, propylene glycol monoethyl ether acetate and propylene glycol diacetate may be used.

Examples of the method for determining the solvent in the sealant composition for a plastic liquid crystal display cell and the amount ratio thereof include a dry loss in weight method, a gas chromatography (fractionation) method, a distilling fractionation method, a gas mass spectral method, an infrared light absorption method, an NMR method and the like.

Additives, such as a leveling agent, a pigment, a dye, a plasticizer, a defoaming agent and the like, may be used depending on necessity.

The sealant composition for a plastic liquid crystal display cell of the invention is prepared by mixing the respective components described in the foregoing.

In the preparation of the one-component sealant composition for a plastic liquid crystal display cell of the invention, the epoxy resin (1), the curing agent (2), the curing accelerator (3), the inorganic filler (4), the silane coupling agent (5) and the rubbery polymer fine particles (6) having a softening point temperature of 0° C. or less and an average particle diameter of primary particles of from 0.01 to 5 μm are mixed, and depending on necessity, the high softening point acrylic polymer fine particles (7) having a softening point temperature of 50° C. or more and an average particle diameter of primary particles of 2 m or less, the wax (8), the controlling agent for providing gaps (9), the electroconductive beads (10), the solvent (11), the leveling agent, the pigment, the dye, the plasticizer, the defoaming agent and the like are added.

In the preparation of the two-component sealant composition for a plastic liquid crystal display cell of the invention, the epoxy resin (1), the curing accelerator (3), the inorganic filler (4), the silane coupling agent (5) and the rubbery polymer fine particles (6) having a softening point temperature of 0° C. or less and an average particle diameter of primary particles of from 0.01 to 5 μm are mixed, and depending on necessity, the high softening point acrylic polymer fine particles (7) having a softening point temperature of 50° C. or more and an average particle diameter of primary particles of 2 μm or less, the wax (8), the controlling agent for providing gaps (9), the electroconductive beads (10), the solvent (11), the leveling agent, the pigment, the dye, the plasticizer, the defoaming agent and the like are added, so as to provide a base resin liquid. In this case, a sole liquid of the curing agent (2) is a curing agent liquid.

The curing agent liquid may be a mixed liquid of the curing agent (2) and the curing accelerator (3), and may also be a mixed liquid of the curing agent (2), the curing accelerator (3) and the inorganic filler (4).

Examples of the mixing method include those methods using a double arm mixing apparatus, a roll kneader, a biaxial extruder, a wet media dispersing apparatus and the like. It may be subjected to a vacuum defoaming treatment after mixing, and filled and sealed in a glass bottle, a plastic vessel or the like, followed by storage and transportation.

The handling viscosity before curing of the sealant composition for a plastic liquid crystal display cell of the invention is preferably in a range of from 1 to 1,000 Pa·s in terms of viscosity at 25° C. by an E type viscometer, more preferably in a range of from 5 to 500 Pa·s, and further preferably in a range of from 10 to 200 Pa·s. The sealant composition for a plastic liquid crystal display cell of the invention may be produced by previously preparing to make the viscosity in the foregoing range with a method, such as heat aging and the like.

The thixotropic index expressed by a viscosity ratio at 1 rpm and 10 rpm (viscosity value at 1 rpm/viscosity value at 10 rpm) obtained from the deviation rate of 10 revolutions per minute with the same rotor number as the E type viscometer is preferably in a range of from 1 to 3.

The plastic liquid crystal display cell using the sealant composition for a plastic liquid crystal display cell of the invention is produced through the following process. FIG. 1 is a flow chart of the process for producing a plastic liquid crystal display cell of the invention.

In the step a1, the sealant composition for a plastic liquid crystal display cell of the invention is coated by screen printing or dispenser coating on a contact seal region of one substrate of a pair of substrates for a plastic liquid crystal display cell.

In the step a2, the pair of substrates are then positioned and adhered.

In the step a3, the assembly is subjected to a heat pressing treatment at from 60 to 100° C. to cure the sealant composition for a plastic liquid crystal display cell. The thickness between the pair of substrates (cell gap) is determined within a range of from 3 to 7 μm depending on the species of the liquid crystal used. In general, a uniform thickness with an error of 0.01 μm or less is obtained by appropriately arranging the gap controlling agent between the substrates.

In the step a4, a liquid crystal is charged in a space surrounded by the pair of substrates and the sealant composition. A charge inlet for charging the liquid crystal is then sealed with a photocuring liquid crystal sealant composition, a two-component liquid crystal sealant composition, an ultraviolet-curing liquid crystal sealant composition or the like. The plastic liquid crystal display cell thus obtained in the manner has high reliability under high temperature and high humidity conditions.

In the step a1, after coating the sealant composition of the invention on one of the substrates, the sealant composition may be subjected to a pre-curing treatment at preferably from 50 to 110° C., and more preferably from 80 to 100° C. The period of time for the pre-curing treatment is from 5 to 30 minutes. It is preferred that the higher the temperature is, the shorter the period is. A pre-curing treatment exceeding 110° C. can produce a plastic liquid crystal display cell, but it is difficult to assure the accuracy of the gap width.

Examples of the substrate for the plastic liquid crystal display cell include a plastic substrate formed with polyester, polyallylate, polycarbonate, polyethersulfone and the like. A transparent electrode represented by indium oxide, an orientation film represented by polyimide, an inorganic ion shielding film and the like are formed on the substrate. While a plastic substrate is described in this embodiment, the invention can be applied to a glass substrate.

The heat curing conditions of the heat pressing treatment in the step a3 are from 60 to 100° C. for from 0.5 to 24 hours, and preferably from 70 to 90° C. for from 1 to 10 hours.

In the case where the adhesion process of the substrate by the heat pressing treatment is carried out by a sheet heat press method, it may be produced by two steps or plural steps of the heating step and the aging step, in which the pair of substrates are adhered under the conditions that assure temporary adhesion, preferably conditions of from 100 to 110° C. for from 3 to 20 minutes, and then the pair of substrates are taken out by releasing the pressure, followed by complete hardening and curing in a heating oven at the same temperature.

The sheet heat pressing method herein means a heat pressing method of adhering every sets of substrate. A sheet heat pressing method of adhering by applying heat in vacuum is referred to as a vacuum sheet heat pressing method, and a sheet heat pressing method of forcibly adhering with applying heat and pressure through heat plates under atmospheric pressure is referred to as a rigid body sheet heat pressing method. Both the sheet heat pressing methods may be used. A multiplaten heat press method may be used instead of the sheet heat pressing method.

Examples of the photocuring liquid crystal sealant composition include a composition containing a poly(meth) acrylate compound and a photoinitiator, a composition containing an epoxy resin and an ultraviolet ray initiator, a compound containing an oxetane compound and a photoinitiator, a composition containing an epoxy resin, an oxetane compound and a photoinitiator, and the like.

Examples of the two-component liquid crystal sealant composition include a two-component liquid crystal sealant composition formed with an epoxy resin and a polyamide curing agent, a two-component sealant composition for a plastic liquid crystal display cell of the invention formed with an epoxy resin and a polythiol curing agent, a two-component liquid crystal sealant composition formed with an epoxy resin and a polyamine curing agent, and the like.

Examples of the liquid crystal include a nematic liquid crystal, a ferroelectric liquid crystal and the like.

Examples of the liquid crystal display cell used in the invention include a TN (twisted nematic) type liquid crystal display cell proposed by M. Schadt, W. Helfrich, et al., a STN (super twisted nematic) type liquid crystal display cell, a ferroelectric type liquid crystal display cell proposed by N. A. Clark and S. T. Lagerwall, a liquid crystal display cell provided with thin film transistors (TFT) for the respective pixels, and the like.

EXAMPLES

The invention will be described in more detail with reference to the examples below, but it is not limited thereto. All percents and parts in the examples mean percents by weight and parts by weight.

The raw materials (abbreviated symbols) used in the examples are as follows.

Test Methods

The methods for an evaluation test carried out for the sealant composition for a plastic liquid crystal display cell and a cured product thereof will be described below.

Storage Stability Test

While assuming the 20° C. E type viscosity value measured by an E type viscometer when 100 parts of the sealant composition for a plastic liquid crystal display cell was put and sealed in a vessel made of polyethylene to be 100, the E type viscosity value after 30 days at -10° C. is measured and expressed in terms of the rate of change thereof. The evaluation of the rate of change is shown below.

| | |
|---|---|
| B: | Rate of change of less than 10% with good storage stability |
| C: | Rate of change of from 10 to 50% with some problems in storage stability |
| D: | Rate of change exceeding 50% with poor storage stability |

Coating Workability Test

The sealant composition for a plastic liquid crystal display cell sealed and stored in a vessel made of polyethylene at a freezing point or less was taken out and was allowed to be room temperature 25° C. over two hours. While assuming the 25° C. E type viscosity value at that time to be 100, the E type viscosity value after allowing to stand at 25° C. for 12 hours is measured and expressed in terms of the rate of change thereof. The evaluation of the rate of change is shown below.

| | |
|---|---|
| B: | Rate of change of less than 15% with good coating workability |
| C: | Rate of change of from 15 to 50% slightly lacking coating workability |
| D: | Rate of change exceeding 50% considerably lacking coating workability |

E Type Viscosity Characteristics at 80 to 120° C. of Composition Subjecting to B Stage The sealant composition for a plastic liquid crystal display cell was coated on a smooth releasing film to a thickness of 50 μm, and 0.6 part of a composition subjecting to B stage obtained by treating at 75° C. for 20 minutes was quickly sampled. The composition subjecting to B stage was increased in temperature from 80° C. to 120° C. at an even rate of 1° C. per two minutes, and a temperature-viscosity curve was obtained with an E type viscometer. The lowest viscosity in a range of from 80 to 120° C. (hereinafter sometimes referred to as a bottom viscosity) was read from the temperature-viscosity curve. The evaluation of the bottom viscosity is shown below.

| | |
|---|---|
| D(-): | Case where the bottom viscosity is 5 Pa·s |
| A: | Case where the bottom viscosity is from 5 to 500 Pa·s |
| B: | Case where the bottom viscosity is from 501 to 5,000 Pa·s |
| D(-): | Case where the bottom viscosity exceeds 5,000 Pa·s |

Water Vapor Permeability Characteristics

The sealant composition for a plastic liquid crystal display cell was coated on a smooth releasing film to a thickness of 100 μm and subjected to a heat treatment at 75° C. for 20 minutes and further to hardening at 90° C. for 5 hours, and the resulting cured film was cut out. The cured film was subjected to a water vapor permeability test according to the water vapor permeability test for a moisture proof packing material (cup method) of the Japanese Industrial Standard (JIS) according to JIS Z0208, so as to obtain the amount of water vapor penetrated at 60° C. for 24 hours per 100 μm in film thickness (unit: $g/m^2 \cdot 24$ hrs) The evaluation of the water vapor permeability characteristics is shown below.

| | |
|---|---|
| B: | The 60° C. water vapor permeability characteristics are less than 200 $g/m^2 \cdot 24$ hrs, and the sealant composition for a plastic cell is excellent in low water vapor permeability. |
| C: | The 60° C. water vapor permeability characteristics are from 201 to 250 $g/m^2 \cdot 24$ hrs, and the sealant composition for a plastic cell is somewhat lacking in low water vapor permeability. |
| D: | The 60° C. water vapor permeability characteristics exceed 251 $g/m^2 \cdot 24$ hrs, and the sealant composition for a plastic cell is considerably lacking in low water vapor permeability. |

Heat Deformation Temperature of Cured Product

The sealant composition for a plastic liquid crystal display cell was coated on a smooth releasing film to a thickness of 100 μm and subjected to a heat treatment at 75° C. for 20 minutes and further to hardening at 90° C. for 5 hours, and the resulting cured film was cut out to a small piece (15 mm square) The cured film as measured for TMA (thermomechanical analysis) under increasing temperature from −30° C. to 150° C. with a rate of 5° C. per minute. The inflection point of the distortion amount was assumed to be the heat deformation temperature (Tg) of the cured product.

Modulus of Cured Product

The sealant composition for a plastic liquid crystal display cell was coated on a smooth releasing film to a thickness of 100 μm and subjected to a heat treatment at 75° C. for 20 minutes and further to hardening at 90° C. for 5 hours, and the resulting cured film was cut out to a size of 3 mm×500 mm. The cured film was measured for the storage modulus under the environments of from 20 to 80° C. by a Vipron viscoelasticity measuring apparatus.

Water Absorption of Cured Product

The sealant composition for a plastic liquid crystal display cell was coated on a smooth releasing film to a thickness of 100 μm and subjected to a heat treatment at 75° C. for 20 minutes and further to hardening at 90° C. for 5 hours, and the resulting cured film was cut out to a size of 100 mm square. The cured film was immersed in boiling water for 30 minutes to obtain the increasing amount of weight, and the value was divided by the original weight and multiplied by 100 to provide a water absorption.

That is, it is expressed by the following.

Water absorption (%)=(Increasing amount of weight after immersing in boiling water/Weight before test)×100

Free Ion Concentration 10 parts by weight of the sealant composition for a plastic liquid crystal display cell and 10 times the amount thereof of pure water were stirred and mixed to be extracted at 60° C. for 30 minutes to provide an aqueous solution, and the ionic conductivity thereof was measured. The evaluation of the ionic conductivity is shown below.

| | |
|---|---|
| B: | Ionic conductivity of extracted water of less than 1 mS/m |
| C: | Ionic conductivity of extracted water of from 1 to 2 mS/m |
| D: | Ionic conductivity of extracted water exceeding 2 mS/m |

Adhesion Seal Test

The plastic liquid crystal display cell produced through the curing process according to the sheet heat press method under the conditions shown in the respective example was observed with the naked eye through a magnifying lens, so as to measure the presence or absence of a seal line, and the presence or absence of seal failure points due to occurrence of seal leak.

T Peel Releasing Test

Plastic substrates made of polyether sulfone (produced by Sumitomo Bakelite Co., Ltd.) cut into a width of 25 mm and a length of 100 mm were adhered with the surfaces in contact with a liquid crystal facing each other by the sealant composition for a plastic liquid crystal display cell with a gap width of 10 μ, so as to form a test piece, and it was measured for a 20° C. T peel strength by an Intesco test apparatus. The evaluation of the results is shown below.

| | |
|---|---|
| A: | Breakage observed in transparent electrode layer and organic underlayer thereof to provide excellent adhesion property |
| B: | Cohesive breakage of sealant composition for plastic liquid crystal display cell involved to provide good heat resistant adhesion property |
| D: | Breakage associated with interface releasing observed to provide problem in heat resistant adhesion force |

Non-effusion Property of Sealant Composition for Plastic Liquid Crystal Display Cell A pair of substrates were adhered by the multiplaten heat press method or the sheet heat press method under the conditions described in the respective examples, and a liquid crystal material RC 4087 (produced by Chisso Corp.) having a threshold voltage of the liquid crystal of 1.38 V and Δε of the liquid crystal of 12.4 was charged from a charging inlet for charging a liquid crystal by a vacuum method. The charging inlet was then sealed with Structbond ES-302 (produced by Mitsui Chemicals, Inc.). A deflection plate was attached to a front substrate of the pair of substrates, and a deflection plate with a reflection plate was attached to the rear substrate. Thereafter, a driving circuit and the like were mounted on the unit to produce a liquid crystal display cell. The evaluation of the non-effusion property was carried out by determining as to whether or not the liquid crystal display function in the vicinity of the sealant in the liquid crystal display cell was normally performed from the initial stage of operation. The evaluation of the results is shown below.

| | |
|---|---|
| B: | Liquid crystal display function exerted by the seal to assure sufficient non-effusion property |
| C: | Liquid crystal display function not normally exerted within 1 mm in the vicinity of the seal to be somewhat lack in non-effusion property |
| D: | Exceeding 1.1 mm in the vicinity of the seal to be considerably lack in non-effusion property |

Seal Function Durability Test

A pair of substrates were adhered by the multiplaten heat press method or the sheet heat press method under the conditions described in the respective examples, and a liquid crystal material RC 4087 (produced by Chisso Corp.) having a threshold voltage of the liquid crystal of 1.38 V and Δε of the liquid crystal of 12.4 was charged from a charging inlet for charging a liquid crystal by a vacuum method. The charging inlet was then sealed with Structbond ES-302 (produced by Mitsui Chemicals, Inc.). The unit was allowed to stand under an atmosphere of 85° C. and RH95% for 250 hours, 500 hours and 1,000 hours and then taken out. A deflection plate was attached to a front substrate of the pair of substrates, and a deflection plate with a reflection plate was attached to the rear substrate. Thereafter, a driving circuit and the like were mounted on the unit to produce a liquid crystal display cell. Change of the display function of the plastic liquid crystal display cell was observed. As the measuring conditions under the measuring environment, it was allowed to stand under an atmosphere of 60° C. and RH90%. The evaluation of the results is shown below.

| | |
|---|---|
| A: | No occurrence of display unevenness observed after 500 hours |
| B: | Slight display unevenness observed within 500 μm in distance from the seal in the fringe of the cell after 500 hours |
| D: | Display unevenness observed beyond 500 μm in distance from the seal in the fringe of the cell to cause considerable deterioration in display function after 500 hours |

Raw Materials Used

1. Epoxy Resin (1)

As the monofunctional epoxy resin, 2-ethylhexyl monoglycidyl ether (abbreviated symbol: 2EHMG) and t-butylphenol monoglycidyl ether (abbreviated symbol: t-BPMG) were used.

As the bifunctional aliphatic epoxy resin, 1,6-hexanediol diglycidyl ether (abbreviated symbol: 1,6-HGDE) and "Epiclon 830S" (average molecular weight: ca. 350 to 370), a trade name, produced by Dainippon Ink And Chemicals, Inc., which was a bifunctional bisphenol F type epoxy resin, as well as "Adeka EP4000S" (average molecular weight: 530 to 550), a trade name, and "Adeka EP4023S" (average molecular weight: 800 to 900), a trade name, produced by Asahi Denka Kogyo K.K., as propylene oxide adduct of bisphenol A type liquid epoxy resins, were used.

As the polyfunctional novolak epoxy resin, "Epo Tohto YDCN-702" (polystyrene conversion weight average molecular weight by GPC: ca. 1,000), a trade name, produced by Tohto Chemical Co., Ltd., was used.

As the aliphatic polyfunctional epoxy resin, polyoxypropylene glycol diglycidyl ether having an epoxy equivalent of 310, polyoxytetramethylene glycol diglycidyl ether having an epoxy equivalent of 557 and 1,6-hexanediol diglycidyl ether having an epoxy equivalent of 165 were used.

2. Curing Agent (2)

As the tetrafunctional mercapto compound, pentaerythritol tetrakis(3-mercaptopropionate) having an ionic conductivity of extracted water by 10 times by weight of pure water at 60° C. of 0.5 mS/m was used.

As the modified polymercapto derivative, such a reaction product was used that was derived in such a manner that 1 equivalent in terms of active hydrogen of pentaerythritol tetrakis(3-mercaptopropionate) having an ionic conductivity of extracted water by 10 times by weight of pure water at 60° C. of 0.5 mS/m was mixed with 0.3 equivalent in terms of active isocyanate group of norbornane diisocyanate, and the mixture was subjected to reaction in the presence of a catalytic amount of triethanolamine until absorption inherent to an isocyanate group was not observed in IR (infrared absorption spectrum analysis).

3. Curing Accelerator (3)

As the 1,1-dimethyl urea derivative, a dimethylamine adduct of tolylene diisocyanate (2,4-(bis(1,1-dimethyl urea)) toluene) was used, and as the DBU salt, a DBU octylic acid salt and a trisdimethylammonomethylphenol octylic acid salt were used. In the case where the curing accelerator was in a solid state, those pulverized by a jet mill to 3 $\mu$m or less as the maximum were used depending on necessity.

4. Inorganic Filler (4)

As amorphous silica, "MU-120" (average primary particle diameter obtained by observation with electron micrograph: 0.07 $\mu$m), a trade name, produced by Shin-Etsu Chemical Co., Ltd. was used; as spherical silica, barium sulfate having an average particle diameter of 1 $\mu$m or less (hereinafter referred to as SO-E1-6) obtained by subjecting "Admafine SO-E1", a trade name, produced by Tatsumori Co., Ltd. to a dry treatment with 6% by weight of γ-glycidoxypropyltrimethoxysilane was used; and as amorphous alumina, high purity alumina powder having $d^{50}$ of 0.2 $\mu$m (imported) was used.

5. Silane Coupling Agent (5)

γ-Glycidoxypropyltrimethoxysilane (KBM403, a trade name, produced by Shin-Etsu Chemical Co., Ltd.) was used.

6. Rubbery Polymer Fine Particles (6)

One of the compositions prepared by the following Synthesis Example 1 and Synthesis Example 2 was used.

Synthesis Example 1

Synthesis of epoxy resin composition (a) containing rubbery polymer fine particles (micro-crosslinking acrylic rubber fine particles, abbreviated as S1)

500 g of Epiclon 830S and 100 g of Adeka EP4000S as the bifunctional epoxy resin, 10 g of methacrylic acid, 0.1 g of triethanolamine and 50 g of toluene were placed in a 2,000-ml four-neck flask equipped with a stirrer, a gas inlet tube, a thermometer and a condenser tube, and reaction was carried at 110° C. for 5 hours under introduction of the air to introduce double bonds. 350 g of butyl acrylate, 20 g of glycidyl methacrylate, 1 g of divinylbenzene, 1 g of azobisdimethylvaleronitrile and 2 g of azobisisobutyronitrile were then added thereto, and reaction was carried out under introduction of nitrogen at 70° C. for 3 hours and then at 90° C. for 1 hour.

Toluene was then removed at 110° C. under reduced pressure to obtain an epoxy resin composition (a).

A part of the epoxy resin composition (a) was quickly cured at low temperature in the presence of a photocuring catalyst. A fracture surface morphology of the resulting cured product of the epoxy resin composition (a) was observed with an electron microscope to measure the dispersed rubber particle diameter, and thus the micro-crosslinking acrylic rubber fine particles (S1) having an average particle diameter of 0.5 $\mu$m were uniformly dispersed. The content of the micro-crosslinking acrylic rubber fine particles (S1) calculated from the amounts of the charged monomer and the remaining monomer was 37.9% by weight.

The softening point temperature of the micro-crosslinking acrylic rubber fine particles (S1) obtained by subjecting the epoxy resin composition (a) to a TBA was −42° C.

Synthesis Example 2

Synthesis of epoxy resin composition (b) containing rubbery polymer fine particles (micro-crosslinking acrylic rubber fine particles, abbreviated as S2).

604 g of Adeka EP4023S as the bifunctional epoxy resin, 6 g of methacrylic acid, 0.2 g of triethanolamine and 50 g of toluene were placed in a 2,000-ml four-neck flask equipped with a stirrer, a gas inlet tube, a thermometer and a condenser tube, and reaction was carried at 110° C. for 5 hours under introduction of the air to introduce double bonds.

350 g of 2-ethylhexyl acrylate, 20 g of glycidyl methacrylate, 1 g of 1,6-hexanediol dimethacrylate, 1 g of azobisdimethylvaleronitrile and 2 g of azobisisobutyronitrile were then added thereto, and reaction was carried out under introduction of nitrogen at 70° C. for 3 hours and then at 90° C. for 1 hour.

Toluene was then removed at 110° C. under reduced pressure to obtain an epoxy resin composition (b).

A part of the epoxy resin composition (b) was quickly cured at low temperature in the presence of a photocuring catalyst. A fracture surface morphology of the resulting cured product of the epoxy resin composition (b) was observed with an electron microscope to measure the dispersed rubber particle diameter, and thus the micro-crosslinking acrylic rubber fine particles (S2) having an average particle diameter of 1.5 $\mu$m were uniformly dispersed. The content of the micro-crosslinking acrylic rubber fine particles (S2) calculated from the amounts of the charged monomer and the remaining monomer was 37.9% by weight.

The softening point temperature of the micro-crosslinking acrylic rubber fine particles (S2) obtained by subjecting the epoxy resin composition (b) to a TBA was −49° C.

Example 1

56 parts of the epoxy resin composition (a), 24 parts of Epiclon 830S, 14.5 parts of the bariumsulfate fine particles, 3 parts of MU-120, 2.4 parts of KBM-403, 0.09 part of the dimethylamine adduct of tolylene diisocyanate and 0.01 part of DBU octylic acid salt were preliminarily mixed in a Dalton mixer. They were then kneaded with three-roll made of ceramics until the solid raw materials became 5 $\mu$m or less, and the kneaded product was subjected to a vacuum defoaming treatment to obtain a base resin liquid (P1 base resin liquid) for a two-component sealant composition for a plastic liquid crystal display cell P1.

Separately, a composition of 76 parts of pentaerythritol tetrakis(3-mercaptopropionate) and 24 parts of the barium sulfate fine particles was preliminarily mixed in a Dalton mixer. They were then kneaded with three-roll made of ceramics until the solid raw materials became 5 μm or less, and the kneaded product was subjected to a vacuum defoaming treatment to obtain a curing agent liquid (P1 curing agent liquid) for the two-component sealant composition for a plastic liquid crystal display cell P1.

The sealant composition for a plastic liquid crystal display cell P1 was formed by mixing 10 parts of the P1 base resin liquid and 5 parts of the P1 curing agent liquid. When the sealant composition for a plastic liquid crystal display cell P1 was allowed to stand at 23° C. for 24 hours, only slight fluctuation in viscosity change of the total system was observed, and it was found that excellent screen printing workability was obtained.

The sealant composition for a plastic liquid crystal display cell P1 had a content of the epoxy resin of 39.22%, a content of the rubbery polymer fine particles of 14.15%, a content of the inorganic filler of 19.66%, a content of the silane coupling agent of 1.6%, a content of the curing agent of 25.3%, and a content of the curing accelerator of 0.07%.

The results of the storage stability test, the results of the coating workability test, the results of the viscosity characteristics subjecting to B stage, the results of the water vapor permeability characteristics, the results of the heat deformation temperature measurement, the results of the free ion concentration measurement, the results of the T peel adhesion test, and the like of the sealant composition for a plastic liquid crystal display cell P1 are shown in Table 1.

5 parts of a glass short fiber spacer having a diameter of 5 μm was mixed with 100 parts of the sealant composition for a plastic liquid crystal display cell P1, and they were mixed and defoamed under sufficient vacuum to obtain a composition. The composition was screen printed on a liquid crystal substrate made of polyether sulfone having a transparent electrode and an orientation film processed (hereinafter referred to as an ITO substrate), which is one of a pair of substrates, to such a pattern that is formed from four cells of a 1-inch size per one substrate arranged vertically and horizontally with a width of the sealant of about 0.5 mm and a thickness thereof of about from 20 to 22 μm. Thereafter, after subjecting the ITO substrate to a heat treatment by a hot air dryer at 90° C. for 15 minutes, an untreated ITO substrate, which is the other substrate of the pair of substrates, was placed thereon, followed by positioning, and 3 to 5 sheets of the assemblies were subjected to heat curing and adhesion all at once by a multiplaten heat press method at a pressing pressure of 0.03 MPa/cm² at 80° C. for 10 hours. As a result, no sample exhibited seal failure points or disorder of seal lines due to occurrence of seal leak, and thus a desired liquid crystal display cell could be produced.

The results of the observation of the liquid crystal display function of the resulting liquid crystal display cell are also shown in Table 1. The results of the seal function durability test carried out by using the resulting liquid crystal display cell are also shown in Table 1.

Example 2

A curing agent liquid composition formed with 84 parts of the modified polymercapto derivative and 16 parts of the barium sulfate fine particles was used as a (P2 curing agent liquid) for a sealant composition for a plastic liquid crystal display cell P2.

Separately, as the sealant composition for a plastic liquid crystal display cell P2, 69.5 parts of the epoxy resin composition (b), 16 parts of Epiclon 830S, 10 parts of the barium sulfate fine particles, 2 parts of MU-120, 1.4 parts of KBM-403, 0.09 part of the dimethylamine adduct of tolylene diisocyanate and 0.02 part of DBU octylic acid salt were preliminarily mixed in a Dalton mixer.

They were then kneaded with three-roll made of ceramics until the solid raw materials became 5 μm or less, and the kneaded product was subjected to a vacuum defoaming treatment to obtain a base resin liquid (P2 base resin liquid) for the two-component sealant composition for a plastic liquid crystal display cell P2. 10 parts of the P2 base resin liquid was mixed with 5 parts of the P2 curing agent liquid.

When the two-component sealant composition for a plastic liquid crystal display cell P2 was allowed to stand at 23° C. for 24 hours, only slight fluctuation in viscosity change of the total system was observed, and it was found that excellent screen printing workability was obtained.

The results of the storage stability test, the results of the coating workability test, the results of the viscosity characteristics subjecting to B stage, the results of the water vapor permeability characteristics, the results of the heat deformation temperature measurement, the results of the free ion concentration measurement, the results of the T peel adhesion test, and the like of the sealant composition for a plastic liquid crystal display cell P2 are shown in Table 1.

5 parts of a glass short fiber spacer having a diameter of 5 μm was mixed with 100 parts of the sealant composition for a plastic liquid crystal display cell P2, and they were mixed and defoamed under sufficient vacuum to obtain a composition. The composition was screen printed on an ITO substrate, which is one of a pair of substrates, to such a pattern that is formed from four cells of a 1-inch size per one substrate arranged vertically and horizontally with a width of the sealant of about 0.5 mm and a thickness thereof of about from 20 to 22 μm. Thereafter, after subjecting the ITO substrate to a heat treatment by a hot air dryer at 90° C. for 15 minutes, an untreated ITO substrate, which is the other substrate of the pair of substrates, was placed thereon, followed by positioning, and 3 to 5 sheets of the assemblies were subjected to heat curing and adhesion all at once by a multiplaten heat press method at a pressing pressure of 0.03 MPa/cm² at 80° C. for 10 hours. As a result, no sample exhibited seal failure points or disorder of seal lines due to occurrence of seal leak, and thus a desired liquid crystal display cell could be produced.

The results of the observation of the liquid crystal display function of the resulting liquid crystal display cell are also shown in Table 1. The results of the seal function durability test carried out by using the resulting liquid crystal display cell are also shown in Table 1.

Example 3

After dissolving 11 parts of Epo Tohto YDCN-702 in 20 parts of Epiclon 830S, 30 parts of the epoxy resin composition (a), 30 parts of SO-E1-6 spherical silica, 2.9 parts of MU-120 as amorphous silica, 4 parts of KBM-403 and 0.1 part of trisdimethylammonomethylphenol octylic acid salt were preliminarily mixed in a Dalton mixer at room temperature.

They were then kneaded with three-roll made of ceramics until the solid raw materials became 5 μm or less, and the kneaded product was subjected to a vacuum defoaming treatment to obtain a base resin liquid (P3 base resin liquid) for a two-component sealant composition for a plastic liquid crystal display cell P3.

Separately, 66 parts of pentaerythritol tetrakis(3-mercaptopropionate), 30 parts of SO-E1-6 spherical silica and 4 parts of MU-120 were preliminarily mixed in a Dalton mixer.

They were then kneaded with three-roll made of ceramics until the solid raw materials became 5 μm or less, and the kneaded product was subjected to a vacuum defoaming treatment to obtain a curing agent liquid (P3 curing agent liquid) for the two-component sealant composition for a plastic liquid crystal display cell P3.

The sealant composition for a plastic liquid crystal display cell P3 was formed by mixing 10 parts of the P3 base resin liquid and 5 parts of the P3 curing agent liquid. When the sealant composition for a plastic liquid crystal display cell P3 was allowed to stand at 23° C. for 24 hours, only slight fluctuation in viscosity change of the total system was observed, and it was found that excellent screen printing workability was obtained.

The sealant composition for a plastic liquid crystal display cell P3 had a content of the epoxy resin of 34.35%, a content of the rubbery polymer fine particles of 7.58%, a content of the inorganic filler of 33.3%, a content of the silane coupling agent of 2.7%, a content of the curing agent of 22%, and a content of the curing accelerator of 0.07%.

The results of the storage stability test, the results of the coating workability test, the results of the viscosity characteristics subjecting to B stage, the results of the water vapor permeability characteristics, the results of the heat deformation temperature measurement, the results of the free ion concentration measurement, the results of the T peel adhesion test, and the like of the sealant composition for a plastic liquid crystal display cell P3 are shown in Table 1.

5 parts of a glass short fiber spacer having a diameter of 5 μm was mixed with 100 parts of the sealant composition for a plastic liquid crystal display cell P3, and they were mixed and defoamed under sufficient vacuum to obtain a composition. The composition was screen printed on an ITO substrate, which is one of a pair of substrates, to such a pattern that is formed from four cells of a 1-inch size per one substrate arranged vertically and horizontally with a width of the sealant of about 0.5 mm and a thickness thereof of about from 20 to 22 μm. Thereafter, after subjecting the ITO substrate to a heat treatment by a hot air dryer at 90° C. for 15 minutes, an untreated ITO substrate, which is the other substrate of the pair of substrates, was placed thereon, followed by positioning, and 3 to 5 sheets of the assemblies were subjected to heat curing and adhesion all at once by a multiplaten heat press method at a pressing pressure of 0.03 MPa/cm$^2$ at 80° C. for 10 hours. As a result, no sample exhibited seal failure points or disorder of seal lines due to occurrence of seal leak, and thus a desired liquid crystal display cell could be produced.

The results of the observation of the liquid crystal display function of the resulting liquid crystal display cell are also shown in Table 1. The results of the seal function durability test carried out by using the resulting liquid crystal display cell are also shown in Table 1.

Comparative Example 1

30 parts of a liquid bisphenol A type epoxy resin having anionic conductivity of 6.2 mS/m of an aqueous solution obtained by extraction separation method by mixing with 10 times by weight of pure water at 60° C. and a number average molecular weight of about 390 by GPC and containing hydrolytic chlorine in a high concentration, 23.4 parts of polyethylene glycol diglycidyl ether having an ionic conductivity of 3.7 mS/m of an aqueous solution obtained by extraction separation method by mixing with 10 times by weight of pure water at 60° C. and an epoxy equivalent of 260 and containing hydrolytic chlorine in a high concentration, 45 parts of the barium sulfate fine particles, 3 parts of "Aerosil 380" produced by Aerosil Co., Ltd., which is colloidal silica powder, 2.5 parts of KBM403 and 0.1 part of DBU octylic acid salt were preliminarily mixed in a Dalton mixer.

They were then kneaded with three rolls until the solid raw materials became 5 μm or less, and the kneaded product was subjected to a vacuum defoaming treatment to obtain a base resin liquid (Q1 base resin liquid) for a two-component sealant composition for a plastic liquid crystal display cell Q1.

Separately, 65 parts of "MR-7B" produced by Mitsui Chemicals, Inc. as a trifunctional mercapto compound, 30 parts of barium sulfate and 5 parts of Aerosil 380 were preliminarily mixed in a Dalton mixer, they were then kneaded with three-roll until the solid raw materials became 5 μm or less, and the kneaded product was subjected to a vacuum defoaming treatment to obtain a curing agent liquid (Q1 curing agent liquid) for the two-component sealant composition for a plastic liquid crystal display cell Q1.

The sealant composition for a plastic liquid crystal display cell Q1 was formed by mixing 10 parts of the Q1 base resin liquid and 5 parts of the Q1 curing agent liquid.

When the sealant composition for a plastic liquid crystal display cell Q1 was allowed to stand at 23° C. for 24 hours, only slight fluctuation in viscosity change of the total system was observed, and the screen printing workability was excellent.

The sealant composition for a plastic liquid crystal display cell Q1 had a content of the epoxy resin of 32.94%, a content of the inorganic filler of 43.67%, a content of the silane coupling agent of 1.67%, a content of the curing agent of 21.65%, and a content of the curing accelerator of 0.07%.

The results of the storage stability test, the results of the coating workability test, the results of the viscosity characteristics subjecting to B stage, the results of the water vapor permeability characteristics, the results of the heat deformation temperature measurement, the results of the free ion concentration measurement, the results of the T peel adhesion test, and the like of the sealant composition for a plastic liquid crystal display cell Q1 are shown in Table 1.

5 parts of a glass short fiber spacer having a diameter of 5 μm was mixed with 100 parts of the sealant composition for a plastic liquid crystal display cell Q1, and they were mixed and defoamed under sufficient vacuum to obtain a composition.

The composition was screen printed on an ITO substrate, which is one of a pair of substrates, to such a pattern that is formed from four cells of a 1-inch size per one substrate arranged vertically and horizontally with a width of the sealant of about 0.5 mm and a thickness thereof of about from 20 to 22 μm. Thereafter, after subjecting the ITO substrate to a heat treatment by a hot air dryer at 70° C. for 15 minutes, an untreated ITO substrate, which is the other substrate of the pair of substrates, was placed thereon, followed by positioning, and the assemblies were subjected to heat curing and adhesion by a multiplaten heat press method at a pressing pressure of 0.03 MPa/cm$^2$ at 80° C. for 10 hours. As a result, no sample exhibited seal failure points or disorder of seal lines due to occurrence of seal leak, and thus a desired liquid crystal display cell could be produced.

The results of the observation of the liquid crystal display function of the resulting liquid crystal display cell are also shown in Table 1. The results of the seal function durability test carried out by using the resulting liquid crystal display cell are also shown in Table 1.

Comparative Example 2

40.3 parts of a curing agent solution obtained by dissolving 28 parts of a liquid obtained by mixing 23.5 parts of "Epo Tohto YH434" produced by Tohto Chemical Co., Ltd., as a tetrafunctional amino epoxy resin, with 4.5 parts of methylcarbitol (also known as diethylene glycol monomethyl ether), 5.8 parts of Epiclon 830S and 29.3 parts of Milex 3L having an ionic conductivity of an aqueous solution obtained by extraction separation by mixing with 10 times by weight of pure water of 0.5 mS/m in 11 parts of methylcarbitol, 0.5 part of amorphous alumina having an average particle diameter $d^{50}$ of 0.02 μm, 1.19 parts of the amorphous silica MU-120, 3.2 parts of Amicure PN-23, 0.01 part of DBN octylic acid salt and 1 part of KBM403 were preliminarily mixed in a Dalton mixer.

They were then kneaded with three-roll until the solid raw materials became 5 μm or less, and the kneaded product was subjected to a vacuum defoaming treatment to obtain a sealant composition for a plastic liquid crystal display cell Q2 of one-component type.

The sealant composition for a plastic liquid crystal display cell Q2 had a content of the epoxy resin of 29.3%, a content of the inorganic filler of 21.69%, a content of the silane coupling agent of 1%, a content of the curing agent of 32.5%, a content of the curing accelerator of 0.01%, and a content of the solvent of 15.5%.

The results of the storage stability test, the results of the coating workability test, the results of the viscosity characteristics subjecting to B stage, the results of the water vapor permeability characteristics, the results of the heat deformation temperature measurement, the results of the free ion concentration measurement, the results of the T peel adhesion test, and the like of the sealant composition for a plastic liquid crystal display cell Q2 are shown in Table 1.

5 parts of a glass short fiber spacer having a diameter of 5 μm was mixed with 100 parts of the sealant composition for a plastic liquid crystal display cell Q2, and they were mixed and defoamed under sufficient vacuum to obtain a composition.

The composition was charged in a dispenser syringe and dispenser-coated on an ITO substrate, which is one of a pair of substrates, to such a pattern that is formed from four cells of a 1-inch size per one substrate arranged vertically and horizontally with a width of the sealant of about 0.5 mm and a thickness thereof of about from 20 to 22 μm. After subjecting the ITO substrate to a heat treatment by a hot air dryer at 60° C. for 30 minutes, an untreated ITO substrate, which is the other substrate of the pair of substrates, was placed thereon, followed by positioning, and the assembly was temporarily adhered by a pressing pressure of 0.03 MPa/cm² at a temperature increased from 70 to 120° C. over 10 minutes for 20 minutes in total, and then subjected to a step of placing it in a heating oven at 120° C. for 9 hours, so as to produce a liquid crystal display cell. As a result, occurrence of seal leak was observed in from 1 to 5 liquid crystal display cells among 10 liquid crystal cells. The remaining liquid crystal display cells assured the sealing property to such an extent that the function as a liquid crystal display cell can be maintained while disorder of seal lines was observed. However, because the modulus of the cured product of the sealant was too high, peeling phenomena at the ITO interface were often observed due to the low adhesion following property on deformation of the substrate when the resulting cells was taken out one-by-one. It was found that the foregoing phenomena often easily occurred when a weak stress of about 50 g as a T peel stress was applied.

Consequently, owing to the fact that the foregoing phenomena were observed, it was easily expected that serious obstructions occurred upon cutting, washing, injection of a liquid crystal, transportation, packaging and assembly processing of the resulting plastic liquid crystal display cells.

TABLE 1

| | Example No. | | | | |
|---|---|---|---|---|---|
| | Example | | | Comparative Example | |
| Subject | 1 | 2 | 3 | 1 | 2 |
| Sealant composition for plastic liquid crystal cell | P1 | P2 | P3 | Q1 | Q2 |
| Test result of storage stability test | B | B | B | B | B |
| Test result of coating workability test | B | B | B | B | B |
| Test result of seal test | | | | | |
| Presence/absence of disorder of seal line | none | none | none | none | present |
| Presence/absence of occurrence of seal leak | none | none | none | none | present |
| Suitability for heat press | suitable | suitable | suitable | suitable | unsuitable |
| Result of water vapor permeability characteristics | B | B | B | C | A |
| E type viscosity characteristic at 50 to 100° C. subjecting B stage | B | B | B | C | D(−) |
| Heat deformation temperature of cured product (° C.) | 34 | 23 | 75 | 5 | 125 |
| Modules at room temperature to 80° C. of cured product Pa | $3 - 5 \times 10^4$ | $7 - 20 \times 10^3$ | $1 - 5 \times 10^5$ | $2 - 4 \times 10^3$ | $3 - 7 \times 10^6$ |
| Water absorbtion of cured product (%) (method of immersing in boiling water for 30 minutes) | 1.0 | 1.1 | 0.8 | >10 | 0.7 |
| Measurement result of free ion concentration | B | B | B | D(+) | B |
| Test result of T peel releasing test | A | A | B | A | D |
| Test result of non-effusion property test of cell | B | B | B | B | not measurable |

TABLE 1-continued

| | Example No. | | | | |
|---|---|---|---|---|---|
| | Example | | | Comparative Example | |
| Subject | 1 | 2 | 3 | 1 | 2 |
| Test result of seal function durability test | | | | | |
| Lapsed for 250 hours | A | A | A | C | not measurable |
| Lapsed for 500 hours | B | A | A | D | |
| Lapsed for 1,000 hours | C | B | A | D | |

As it was apparent from Examples 1 to 3, the liquid crystal display cells produced with the sealant compositions for a liquid crystal display cell of the invention had such functions at the same time as an E type viscosity characteristics at 50 to 100° C. of a composition subjecting to B stage of the sealant composition for a plastic liquid crystal display cell itself of from 5 to 5,000 Pa·s, a water vapor permeability of a cured product of the sealant composition for a plastic liquid crystal display cell itself of less than 200 g/m$^2$·24 hrs, a heat deformation temperature of less than 85° C., a modulus of the cured product in a range of from $0.5 \times 10^4$ to $1 \times 10^6$ Pa, an ionic conductivity of an aqueous solution obtained by extraction by mixing with 10 times by weight of pure water at 60° C. of 1 mS/m or less, and the like. As a result, the seal function durability of the resulting liquid crystal display cells exceeded 1,000 hours.

On the other hand, in Comparative Example 1, the free ion amount of the sealant composition for a plastic liquid crystal display cell was 2 mS/m or more, and the cured product had a considerably high water absorption and was swelled upon wetting, whereby the display quality was considerably deteriorated. As a result of the seal function durability test of the resulting liquid crystal display cell, stable maintenance of the display function was difficult at the time lapsing for 250 hours, and the service life of the liquid crystal display cell was short.

In Comparative Example 2, because the cured product was as hard as having a modulus of $2 \times 10^6$ Pa or more, the adhesion following property to the plastic substrate was lacked, and as a result, it was difficult to produce a plastic liquid crystal display cell in a stable manner.

Consequently, it is understood that the plastic liquid crystal display cell produced by using the sealant composition for a plastic liquid crystal display cell of the invention assures display stability for a long period of time under a high temperature and high humidity condition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein. $Industrial Applicability According to the invention, A. the composition is good in storage stability and coating workability, B. is high in temporary adhesion property after pre-curing, C. is applicable to a multiplaten heat press method and a sheet press heating adhesion method, and is excellent in non-effusion property, non-through bubble property, linearity of seal lines and accurate controllability of gap width, D. the electroconductive ions migrating from the composition are suppressed to a low level, E. a cured product thereof has a low modulus and is rich in film adhesion following property, F. the cured product is rich in low water absorbing property, and G. the cured product is excellent in low water vapor permeability at 60° C.

H. Therefore, the sealant has adhesion durability at high temperatures, and a plastic liquid crystal display cell produced by using the sealant composition for a plastic liquid crystal display cell of the invention has high display stability for a long period of time under a high temperature and high humidity condition.

What is claimed is:

1. A sealant composition for a plastic liquid crystal display cell, comprising:
   a two-component epoxy resin composition comprising a base resin liquid containing the following (1) and (3) to (6) and a curing agent liquid containing the following (2A) or a mixture of the following (2A) and (3), wherein
   the two-component epoxy resin composition is obtained from a two-component mixture of the base resin liquid and the curing agent liquid and contains the following (1) to (6):
   (1) from 15 to 84% by weight of a liquid epoxy resin having from 1.7 to 6 in weight average of epoxy groups in one molecule and an ionic conductivity of an aqueous solution obtained by extraction separation by contact mixing with 10 times by weight of pure water at from 40 to 80° C. of 2 mS/m or less,
   (2A) from 10 to 50% by weight of a curing agent containing one or a mixture of two or more selected from (2A-1) a tetrafunctional mercapto compounds or (2A-2) modified polymercapto derivatives, having an ionic conductivity of an aqueous solution obtained by extraction separation by contact mixing with 10 times by weight of pure water at from 40 to 80° C. of 0.6 mS/m or less,
   (3) from 0.01 to 15% by weight of a curing accelerator,
   (4) from 5 to 50% by weight of an inorganic filler,
   (5) from 0.1 to 5% by weight of a silane coupling agent, and
   (6) from 1 to 25% by weight of rubbery polymer fine particles having a softening temperature of 0° C. or less and an average particle diameter of primary particles of from 0.01 to 5 µm.

2. The sealant composition for a plastic liquid crystal display cell of claim 1, wherein the tetrafunctional mercapto compound (2A-1) is pentaerythritol tetrakis(3-mercaptopropionate), and the modified polymercapto derivative (2A-2) is a modified polymercapto derivative obtained by reacting 1 equivalent in terms of active hydrogen of pentaerythritol tetrakis(3-mercaptopropionate) with from 0.01 to 0.3 equivalent in terms of active isocyanate group of a diisocyanate compound and/or an isocyanate prepolymer thereof.

3. The sealant composition for a plastic liquid crystal display cell of any one of claims 1 and 2, wherein (I) an aqueous solution obtained by mixing the composition and 10 times by weight the composition of pure water at from 40 to 80° C. has an ionic conductivity of 1 mS/m or less, and a cured product of the composition has (II) a water vapor permeability at 60° C. passing a cured film of the composition having a thickness of 100 μm of less than 200 g/m2·24 hrs, (III) a heat deformation temperature (Tg) of a cured product of the composition in a range of from 0 to 85° C., and (IV) a storage modulus under room temperature of a cured product of the composition in a range of from 0.5×104 to 1×106 Pa.

4. The sealant composition for a plastic liquid crystal display cell of claim 1, having an E type viscosity at from 50 to 100° C. after being coated to a thickness of 50 μm and being subjected to a heat treatment at from 50 to 85° C. for 20 minutes of from 5 to 5,000 Pa·s.

5. The sealant composition for a plastic liquid crystal display cell of claim 1, wherein the epoxy resin (1) is a mixed composition of (1-1) an aliphatic and/or alicyclic epoxy resin and (1-2) an aromatic epoxy resin, the aliphatic and/or alicyclic epoxy resin (1-1) is one or a mixture of two or more selected from higher alcohol monoglycidyl ether, polyoxyalkylene glycol diglycidyl ether, 1,6-hexanediol diglycidyl ether, neopentyl glycol diglycidyl ether and glycerin triglycidyl ether, and the aromatic epoxy resin (1-2) is one or a mixture of two or more selected from the group consisting of a bisphenol A type epoxy resin or an alkylene oxide adduct type epoxy resin thereof, a bisphenol F type epoxy resin or an alkylene oxide adduct type epoxy resin thereof, a bisphenol S type epoxy resin, and a bisphenol AD type epoxy resin.

6. The sealant composition for a plastic liquid crystal display cell of claim 1, wherein the curing accelerator (3) is at least one selected from an alkyl urea derivative, trisdimethylamino methylphenol salt and 1,8-diazabicyclo(5,4,0)-7-undecene salt.

7. The sealant composition for a plastic liquid crystal display cell of claim 6, wherein the alkyl urea derivative is at least one selected from 3-(p-chlorophenyl)-1,1-dimethyl urea, 3-(o,p-dichlorophenyl)-1,1-dimethyl urea, 2,4-(bis(1,1-dimethyl urea))toluene and 2,6-(bis(1,1-dimethyl urea))toluene.

8. The sealant composition for a plastic liquid crystal display cell of claim 1, wherein the rubbery fine particles (6) have a primary particle diameter of from 0.1 to 1 μm and are crosslinked rubbery polymer particles.

9. The sealant composition for a plastic liquid crystal display cell of claim 1, wherein at least a part of the inorganic filler (4) is a graft product with the epoxy resin (1) and/or the silane coupling agent (5), and the graft product has a graft ratio expressed by a weight increasing rate obtained by a repeating solvent washing method of from 1 to 50 parts by weight in total of the epoxy resin (1) and the silane coupling agent (5) per 100 parts by weight of the inorganic filler (4).

10. A process for producing a plastic liquid crystal display cell comprising:

a coating step of coating the sealant composition for a plastic liquid crystal display cell of claim 3 on one substrate of a pair of substrates for a plastic liquid crystal display cell, an adhering step of positioning the one substrate and the other substrate and adhering the pair of substrates for a plastic liquid crystal display cell, a sealant composition curing step of subjecting the pair of substrate adhered to each other in the adhering step to a heat pressing treatment at from 60 to 100° C. to cure the sealant composition for a plastic liquid crystal display cell, and a liquid crystal charging step of charging a liquid crystal to a space surrounded by the pair of substrates for a plastic liquid crystal display cell and the sealant composition for a plastic liquid crystal display cell therebetween.

11. A plastic liquid crystal display cell obtained by the process for producing a plastic liquid crystal display cell of claim 10.

* * * * *